US010877359B2

(12) United States Patent
Hanzawa

(10) Patent No.: US 10,877,359 B2
(45) Date of Patent: Dec. 29, 2020

(54) PROJECTION OPTICAL SYSTEM, IMAGE PROJECTION APPARATUS, AND IMAGE PROJECTION SYSTEM FOR A LASER SCANNING PROJECTOR

(71) Applicant: Sony Semiconductor Solutions Corporation, Kanagawa (JP)

(72) Inventor: Fumihiko Hanzawa, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/466,494

(22) PCT Filed: Dec. 8, 2017

(86) PCT No.: PCT/JP2017/044186
§ 371 (c)(1),
(2) Date: Jun. 4, 2019

(87) PCT Pub. No.: WO2018/110448
PCT Pub. Date: Jun. 21, 2018

(65) Prior Publication Data
US 2019/0317387 A1 Oct. 17, 2019

(30) Foreign Application Priority Data
Dec. 12, 2016 (JP) .................. 2016-240514

(51) Int. Cl.
*G03B 21/14* (2006.01)
*G02B 26/10* (2006.01)
*G02B 27/09* (2006.01)
(52) U.S. Cl.
CPC ........... *G03B 21/142* (2013.01); *G02B 26/10* (2013.01); *G02B 26/101* (2013.01); *G02B 27/0955* (2013.01)

(58) Field of Classification Search
CPC .. G02B 26/10; G02B 26/101; G02B 27/0955; G02B 27/18; G03B 21/142
See application file for complete search history.

(56) References Cited

U.S. PATENT DOCUMENTS 5,054,866 A * 10/1991 Tomita .................. G02B 26/10
250/236
6,323,984 B1 * 11/2001 Trisnadi ................. G02B 27/48
348/E9.026

(Continued)

FOREIGN PATENT DOCUMENTS

JP  2002-280325 A  9/2002
JP  2009-180821 A  8/2009

(Continued)

OTHER PUBLICATIONS

International Search Report and English translation thereof dated Mar. 6, 2018 in connection with International Application No. PCT/JP2017/044186.

*Primary Examiner* — Bao-Luan Q Le
(74) *Attorney, Agent, or Firm* — Wolf, Greenfield & Sacks, P.C.

(57) ABSTRACT

A projection optical system according to the present disclosure includes, in order from a side on which a light source is located to a projection side along an optical axis: a first lens group that includes one or more lenses, has a positive focal length, and condenses light from the light source on a primary image-forming point that is an image of the light source; a deflector that scans light from the first lens group; and a second lens group that includes one or more lenses, has a positive focal length, and forms an image of light from the deflector at a position of a secondary image-forming point that is an image of the primary image-forming point, and the (Continued)

first lens group forms the primary image-forming point between the first lens group and the second lens group along the optical axis.

9 Claims, 11 Drawing Sheets

(56) References Cited

U.S. PATENT DOCUMENTS

| | | | | |
|---|---|---|---|---|
| 7,106,483 B2* | 9/2006 | Hayashi | G02B 26/125 | 347/244 |
| 7,164,516 B2* | 1/2007 | Hayashi | G02B 26/125 | 347/244 |
| 7,298,537 B2* | 11/2007 | Hayashi | G02B 26/125 | 347/244 |
| 7,397,591 B2* | 7/2008 | Hayashi | G02B 26/125 | 347/244 |
| 7,428,088 B2* | 9/2008 | Ishibe | G02B 5/1895 | 347/259 |
| 7,656,592 B2* | 2/2010 | Frangineas | G02B 27/0955 | 359/754 |
| 7,792,163 B2* | 9/2010 | Nakayama | G02F 1/37 | 359/328 |
| 7,869,112 B2* | 1/2011 | Borchers | G02B 26/123 | 359/216.1 |
| 7,884,816 B2* | 2/2011 | Burroughs | G02B 26/101 | 345/213 |
| 7,964,841 B2* | 6/2011 | Imai | G02B 26/101 | 250/234 |
| 7,988,304 B2* | 8/2011 | Yamamoto | G02B 27/646 | 348/746 |
| 8,089,425 B2* | 1/2012 | Malyak | G02B 26/105 | 345/32 |
| 8,197,066 B2* | 6/2012 | Nagashima | H04N 9/3155 | 353/10 |
| 8,384,625 B2* | 2/2013 | Hajjar | G02B 26/101 | 345/75.1 |
| 8,451,195 B2* | 5/2013 | Hajjar | G02B 26/101 | 345/75.1 |
| 8,593,711 B2* | 11/2013 | Borchers | G02B 26/127 | 359/219.2 |
| 8,810,880 B2* | 8/2014 | Hamano | G02B 13/0005 | 353/69 |
| 9,182,595 B2* | 11/2015 | Imai | G02B 15/00 | |
| 9,217,862 B2* | 12/2015 | Hajjar | G02B 26/123 | |
| 9,247,189 B2* | 1/2016 | Kato | H04N 9/3129 | |
| 9,729,837 B2* | 8/2017 | Hajjar | G02B 26/123 | |
| 10,365,407 B2* | 7/2019 | Bukesov | G02B 26/105 | |
| 2002/0163730 A1 | 11/2002 | Sugiyama et al. | | |
| 2005/0018268 A1* | 1/2005 | Hayashi | G02B 26/125 | 359/207.1 |
| 2006/0092492 A1* | 5/2006 | Ishibe | G02B 5/1895 | 359/207.1 |
| 2006/0139718 A1* | 6/2006 | Ishihara | G02B 26/101 | 359/205.1 |
| 2006/0268382 A1* | 11/2006 | Hayashi | G02B 26/125 | 359/201.1 |
| 2007/0081217 A1* | 4/2007 | Hayashi | G02B 26/125 | 359/201.1 |
| 2007/0120983 A1* | 5/2007 | Yamamoto | G03B 21/28 | 348/208.99 |
| 2007/0140092 A1* | 6/2007 | Frangineas | G02B 27/0955 | 369/112.18 |
| 2007/0187616 A1* | 8/2007 | Burroughs | G02B 26/101 | 250/458.1 |
| 2007/0188417 A1* | 8/2007 | Hajjar | G02B 26/101 | 345/75.1 |
| 2007/0206258 A1* | 9/2007 | Malyak | G02B 26/105 | 345/204 |
| 2008/0043307 A1* | 2/2008 | Hayashi | G02B 26/125 | 359/205.1 |
| 2008/0219302 A1* | 9/2008 | Nakayama | G02F 1/37 | 372/21 |
| 2009/0128717 A1* | 5/2009 | Nagashima | H04N 9/3129 | 348/756 |
| 2009/0174935 A1 | 7/2009 | Szulczewski et al. | | |
| 2010/0014058 A1* | 1/2010 | Imai | G03B 21/006 | 353/98 |
| 2010/0020377 A1* | 1/2010 | Borchers | G02B 26/123 | 359/216.1 |
| 2010/0296144 A1* | 11/2010 | Borchers | G02B 26/127 | 359/216.1 |
| 2011/0074660 A1* | 3/2011 | Hajjar | G02B 26/101 | 345/75.1 |
| 2011/0109884 A1* | 5/2011 | Hudman | G02B 26/108 | 353/70 |
| 2011/0128602 A1* | 6/2011 | Hamano | G02B 13/0005 | 359/205.1 |
| 2011/0298820 A1* | 12/2011 | Hajjar | G02B 26/123 | 345/619 |
| 2012/0300047 A1* | 11/2012 | Husak | G03B 33/00 | 348/56 |
| 2014/0055756 A1* | 2/2014 | Kato | G02B 26/101 | 353/31 |
| 2014/0085695 A1* | 3/2014 | Borchers | G02B 26/123 | 359/201.2 |
| 2014/0153072 A1* | 6/2014 | Imai | G02B 26/10 | 359/201.2 |
| 2015/0177600 A1* | 6/2015 | Matsubara | G03B 21/28 | 353/31 |
| 2016/0112686 A1* | 4/2016 | Hajjar | G02B 26/123 | 348/756 |
| 2016/0146433 A1* | 5/2016 | Bukesov | G02B 1/10 | 348/744 |
| 2018/0120557 A1* | 5/2018 | Pilard | G01B 11/026 | |

FOREIGN PATENT DOCUMENTS

| | | |
|---|---|---|
| JP | 2015-179245 A | 10/2015 |
| JP | 2016-028682 A | 3/2016 |
| WO | WO 2016/208194 A1 | 12/2016 |

\* cited by examiner

[ FIG. 1 ]
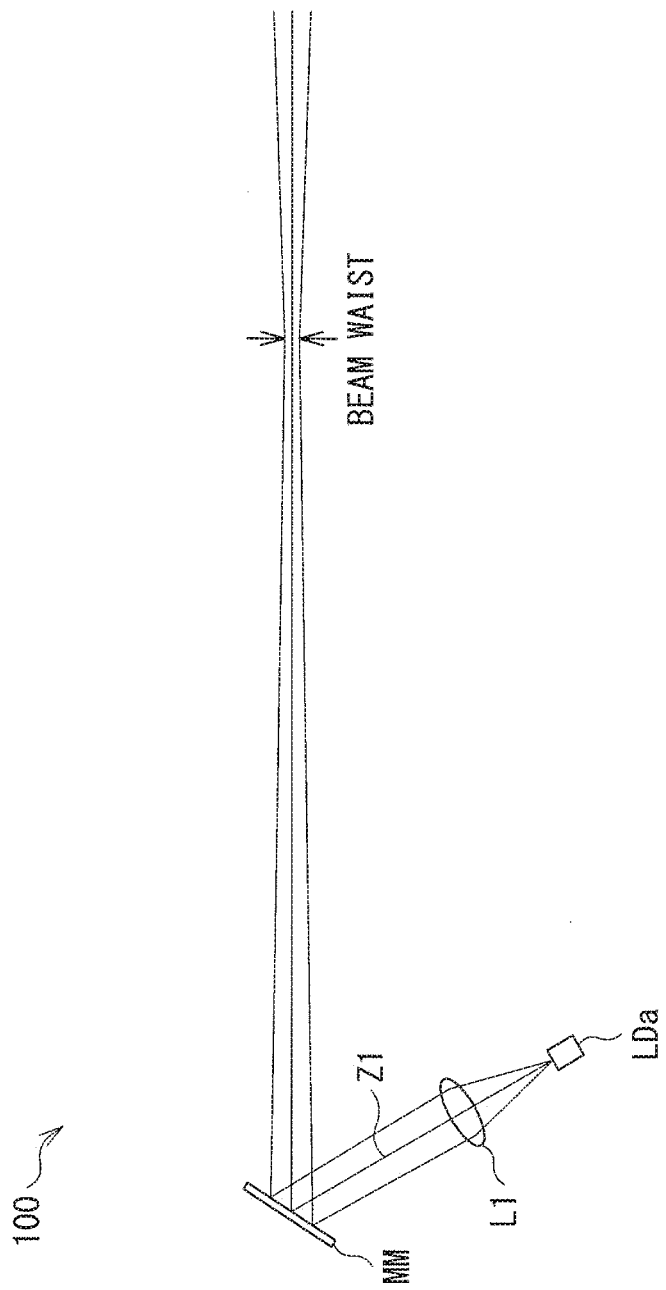

[FIG. 2]
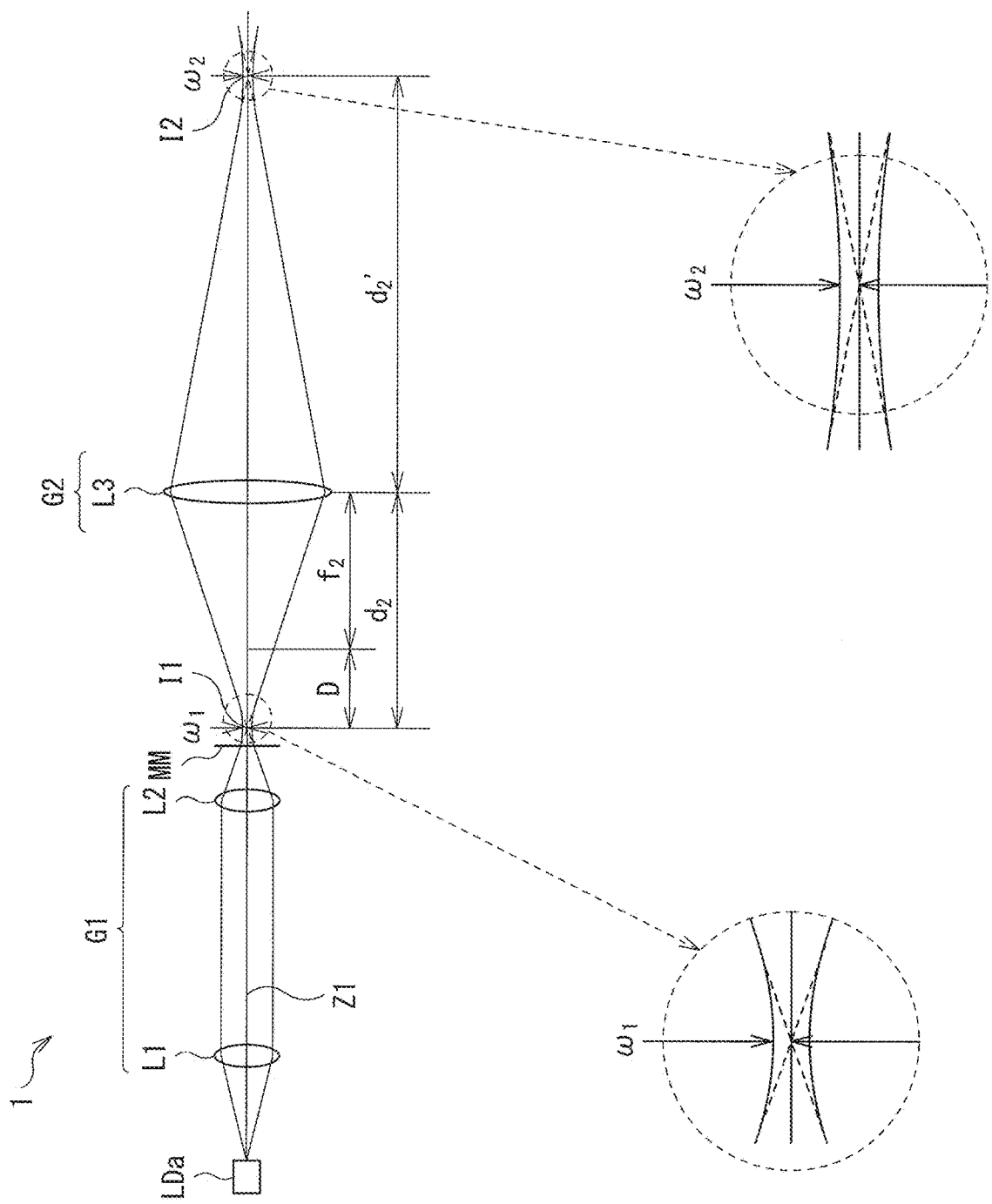

[ FIG. 3 ]
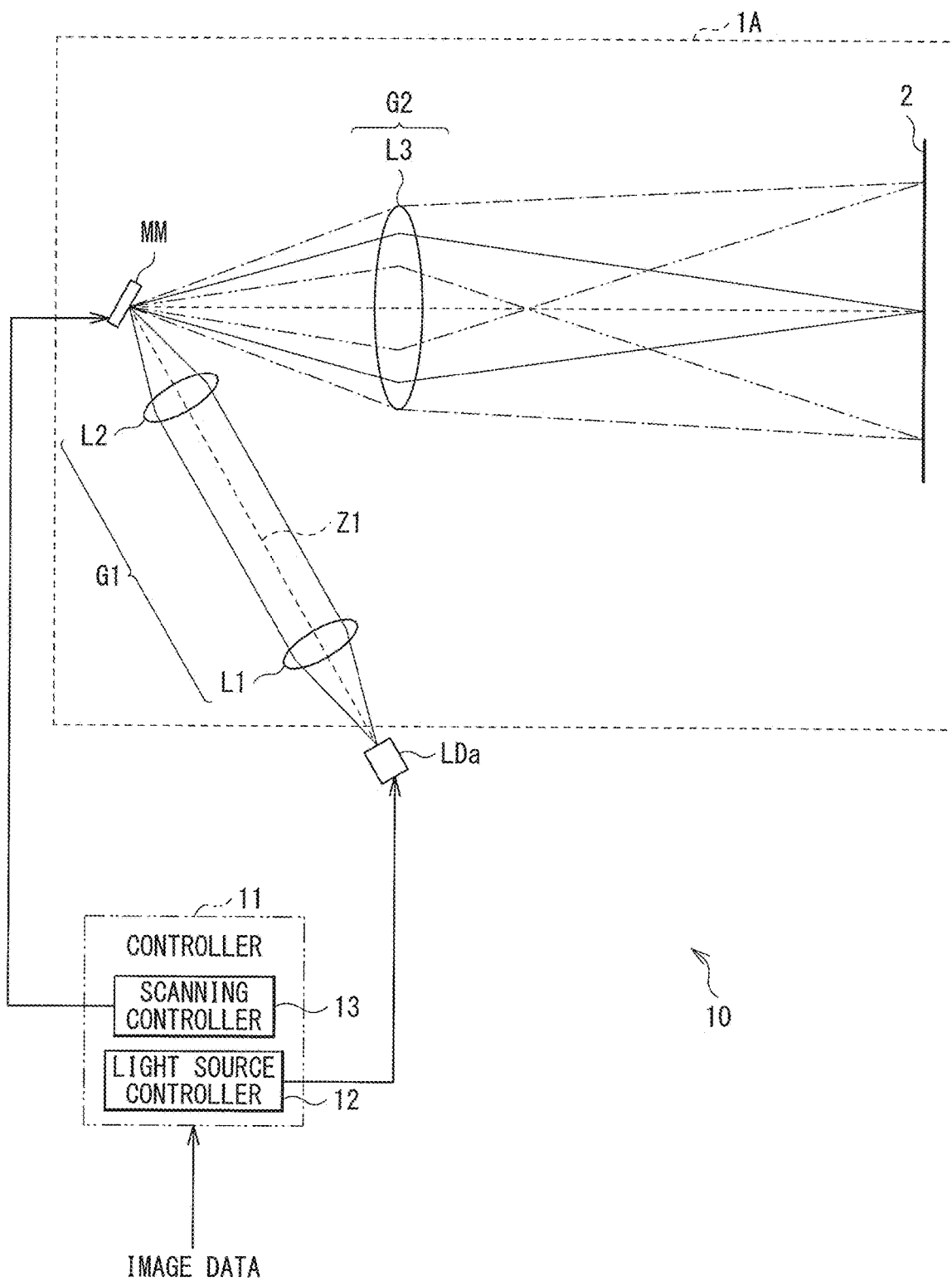

[FIG. 4]
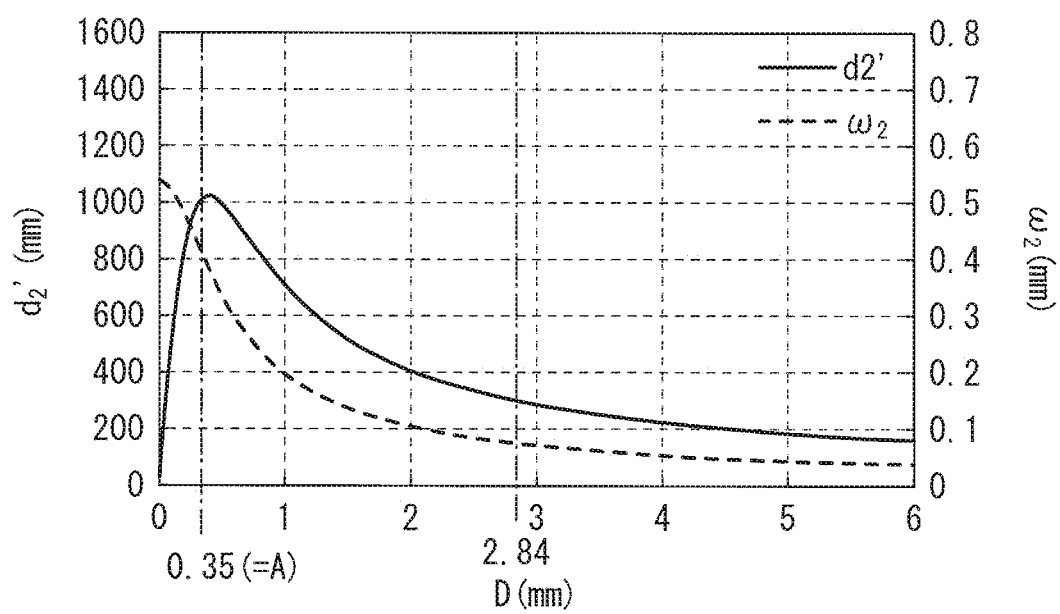

[FIG. 5]
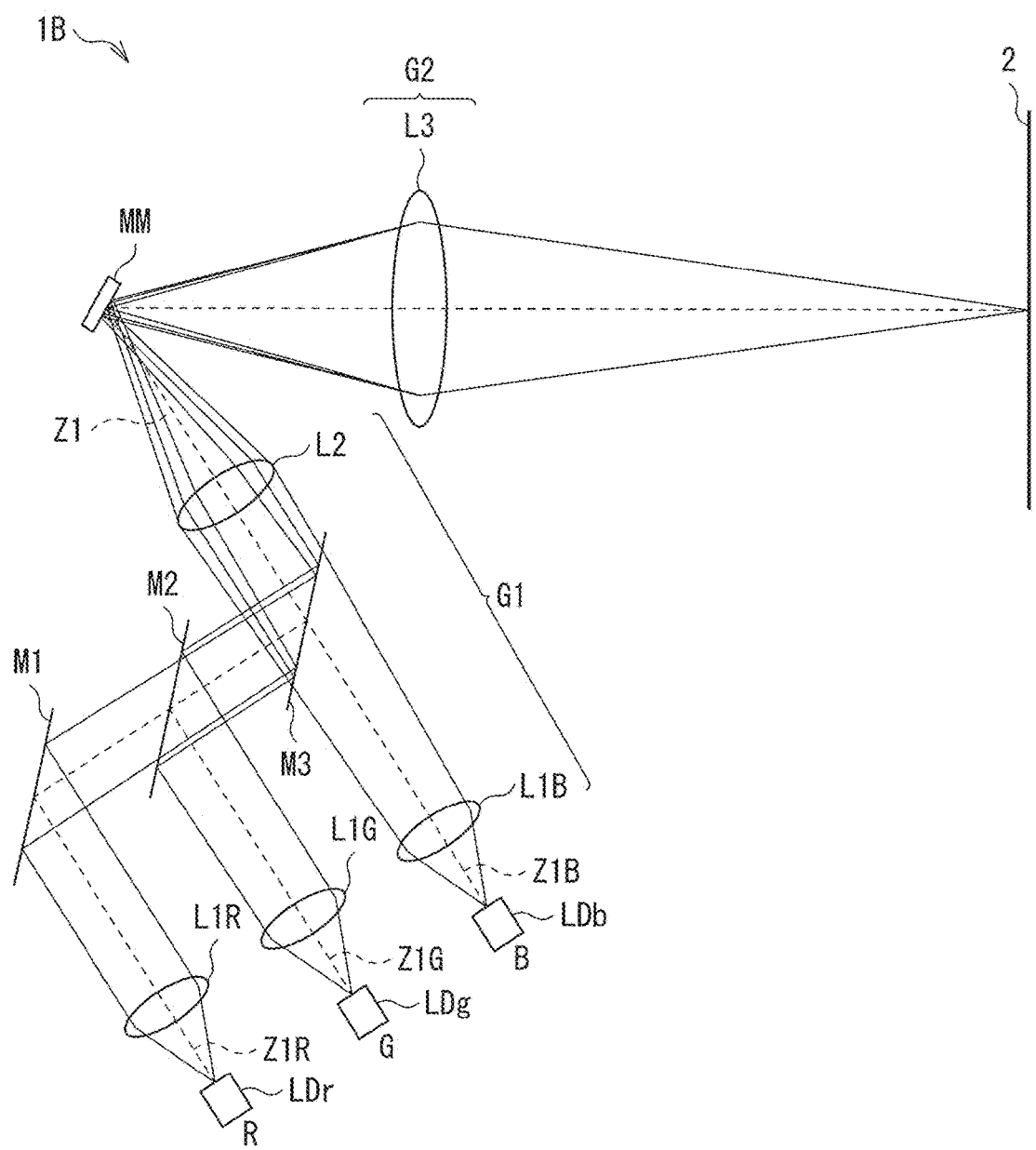

[FIG. 6]
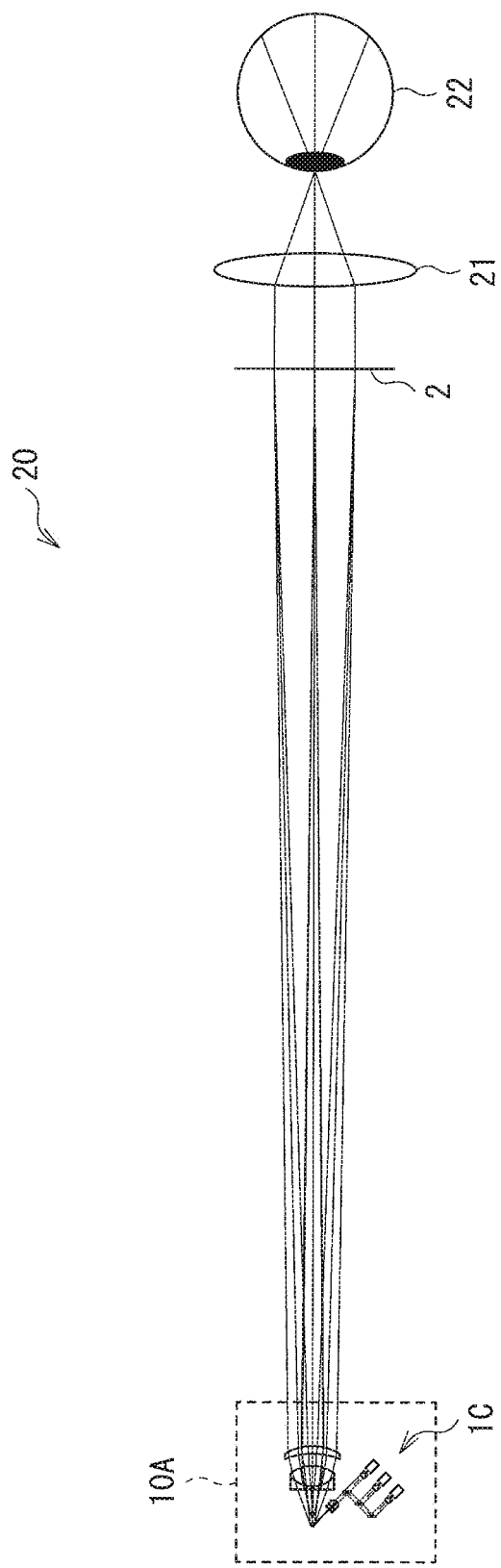

[ FIG. 7 ]
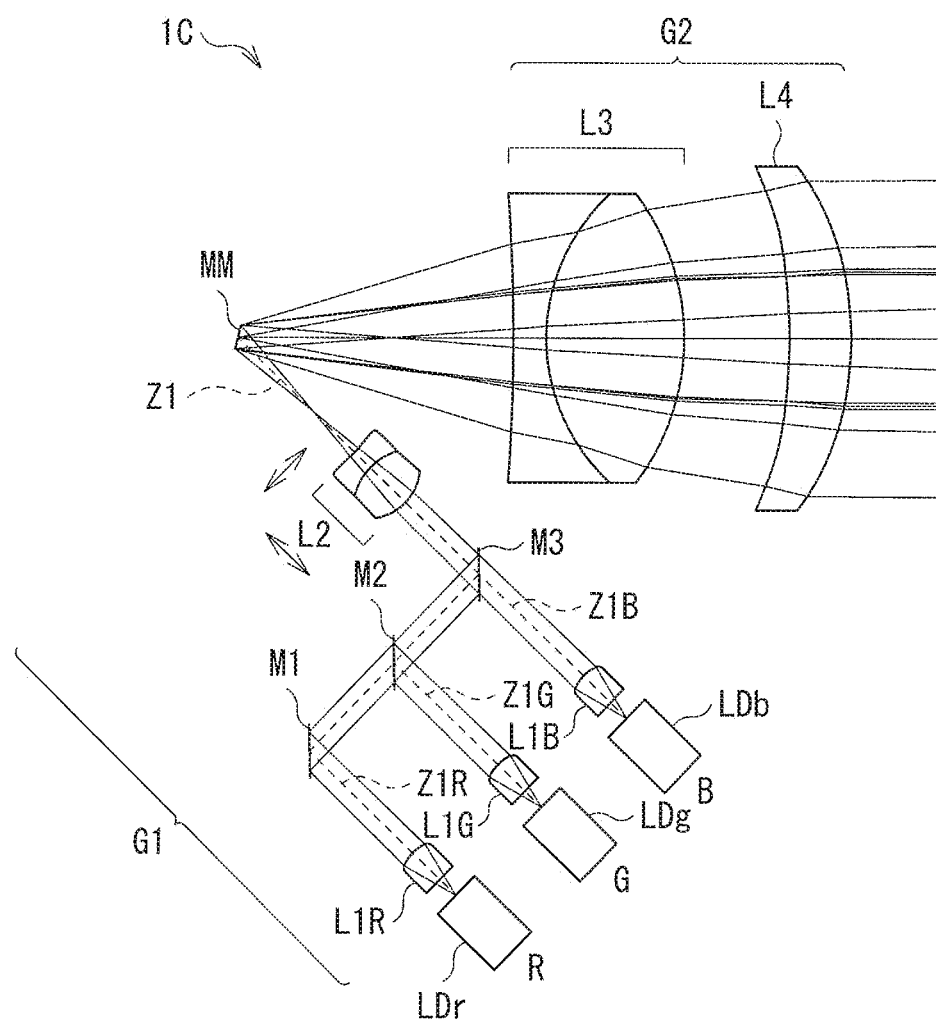

[ FIG. 8 ]
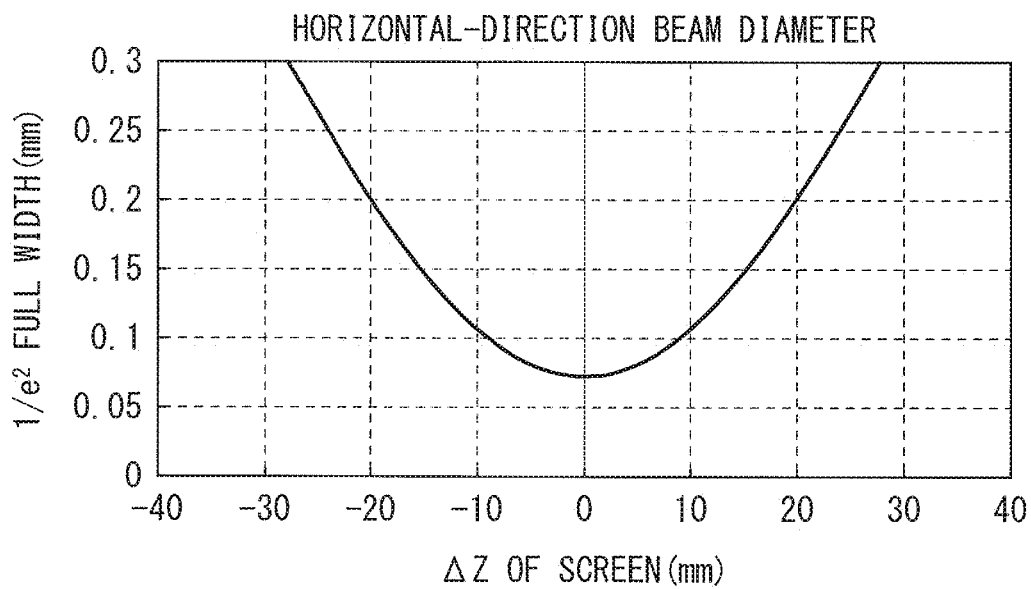
[ FIG. 9 ]
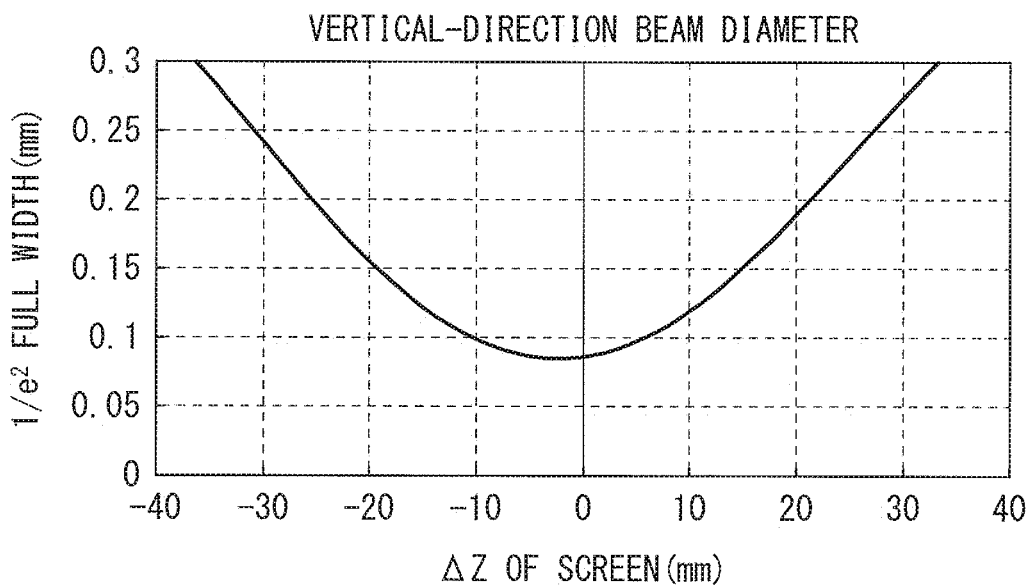

[ FIG. 10 ]
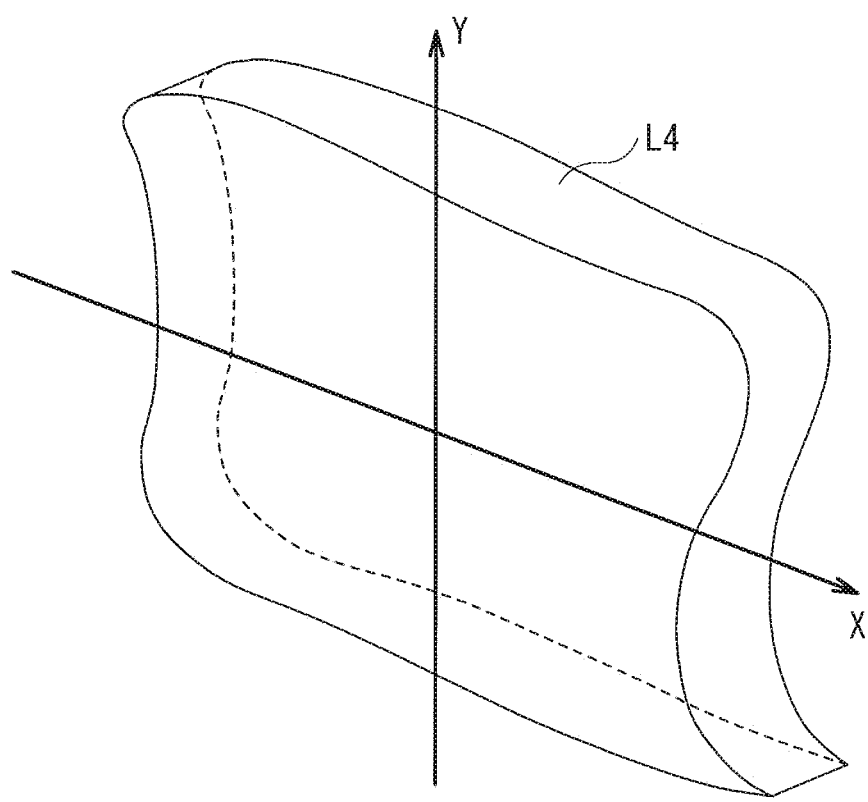

[ FIG. 11 ]
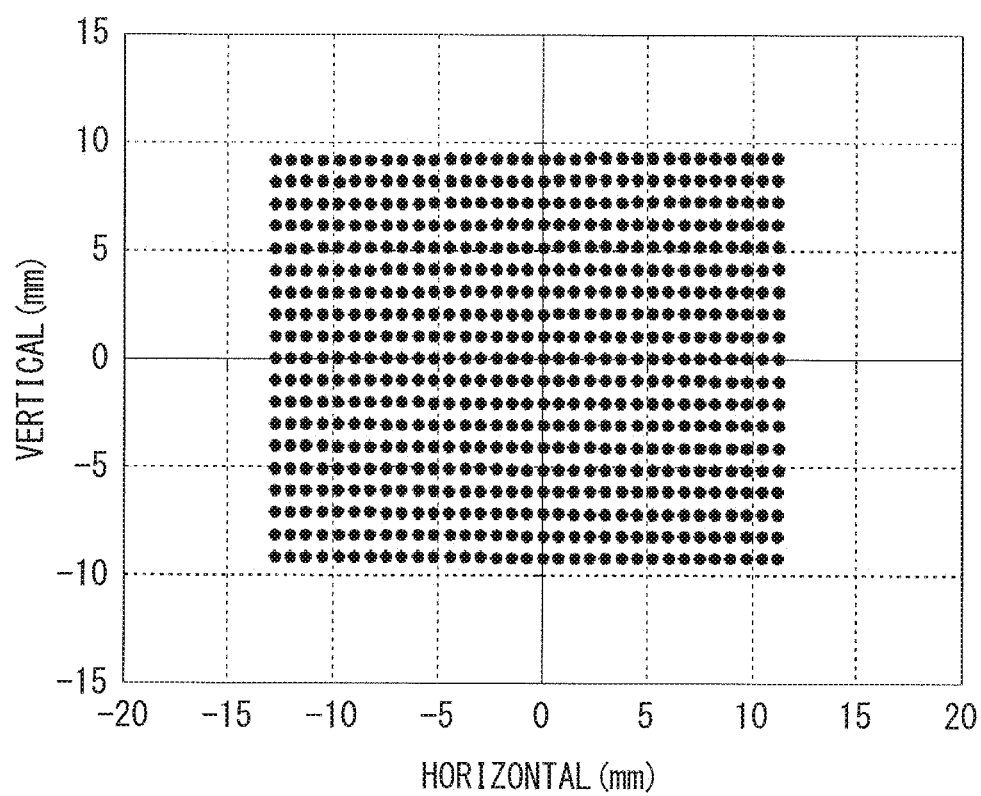

[ FIG. 12 ]
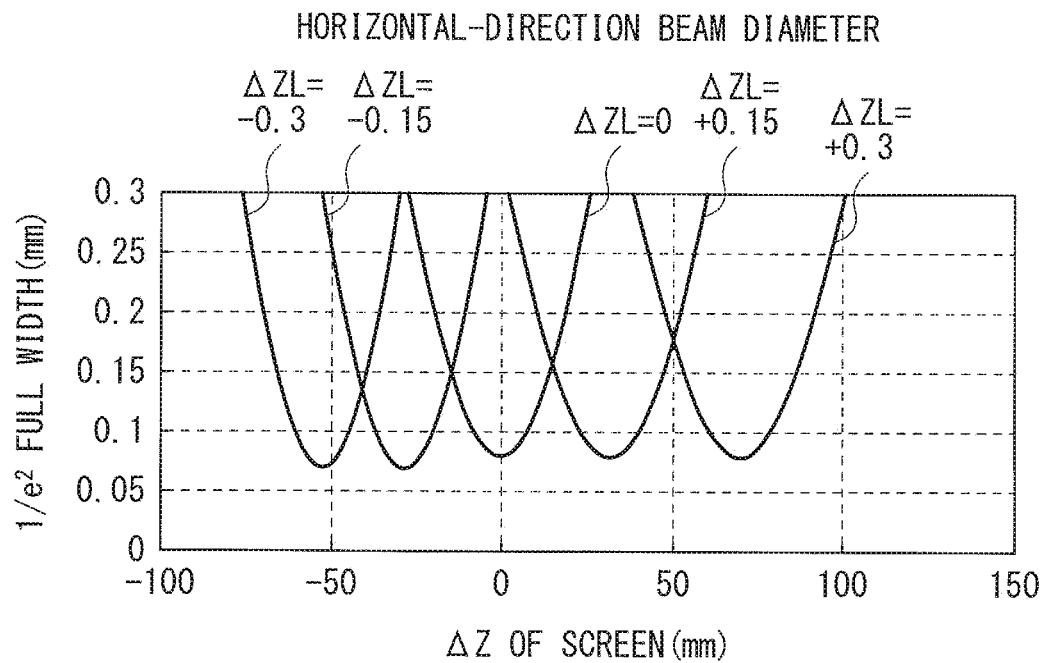
[ FIG. 13 ]
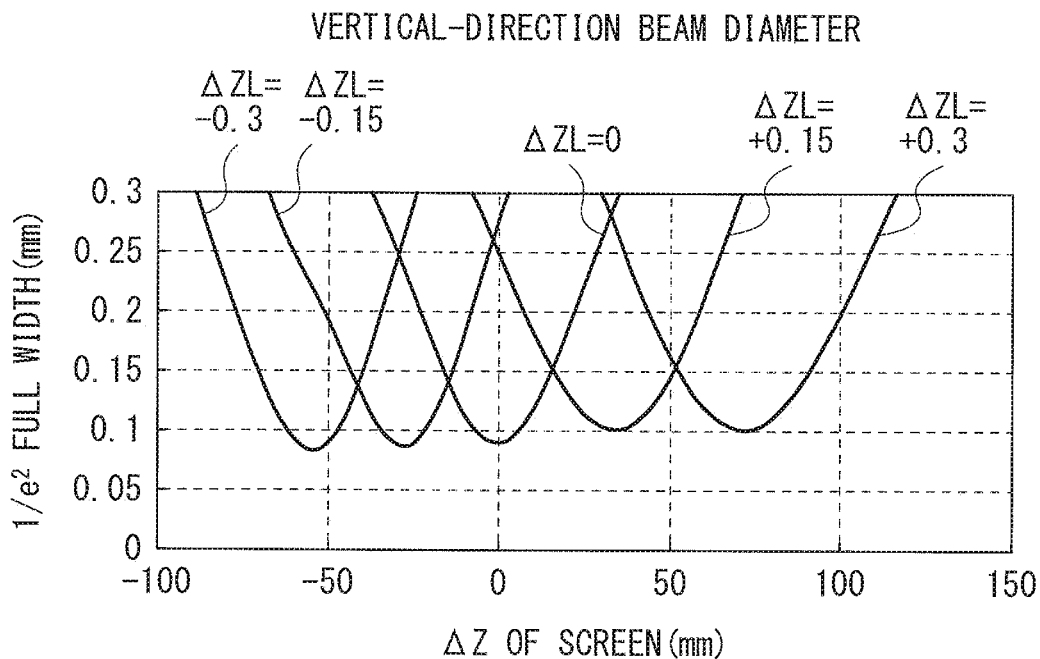

PROJECTION OPTICAL SYSTEM, IMAGE PROJECTION APPARATUS, AND IMAGE PROJECTION SYSTEM FOR A LASER SCANNING PROJECTOR

CROSS-REFERENCE TO RELATED APPLICATIONS

This application claims the benefit under 35 U.S.C. § 371 as a U.S. National Stage Entry of International Application No. PCT/JP2017/044186, filed in the Japanese Patent Office as a Receiving Office on Dec. 8, 2017, which claims priority to Japanese Patent Application Number JP2016-240514, filed in the Japanese Patent Office on Dec. 12, 2016, each of which is hereby incorporated by reference in its entirety.

TECHNICAL FIELD

The present disclosure relates to a projection optical system, an image projection apparatus, and an image projection system.

BACKGROUND ART

There is a laser scanning projector that projects an image through two-dimensionally scanning light from a laser light source by a deflection mirror.

CITATION LIST

Patent Literature

PTL 1: Japanese Unexamined Patent Application Publication No. 2015-179245
PTL 2: Japanese Unexamined Patent Application Publication No. 2009-180821

SUMMARY OF THE INVENTION

In association with higher resolution of an inputted image source, a projector may also need output of an image having high resolution corresponding to the inputted image source. Demand for higher resolution of a projector is increasing with each passing year by improvements in device technology, control technology, image processing technology, and optical technology.

It is desirable to provide a projection optical system, an image projection apparatus, and an image projection system that have a small size, a light weight, and high resolution.

A projection optical system according to an embodiment of the present disclosure includes, in order from a side on which a light source is located to a projection side along an optical axis: a first lens group that includes one or more lenses, has a positive focal length, and condenses light from the light source on a primary image-forming point that is an image of the light source; a deflector that scans light from the first lens group; and a second lens group that includes one or more lenses, has a positive focal length, and forms an image of light from the deflector at a position of a secondary image-forming point that is an image of the primary image-forming point, and the first lens group forms the primary image-forming point between the first lens group and the second lens group along the optical axis.

An image projection apparatus according to an embodiment of the present disclosure includes: a light source; and a projection optical system that projects an image on the basis of light from the light source. The projection optical system includes, in order from a side on which the light source is located to a projection side along an optical axis: a first lens group that includes one or more lenses, has a positive focal length, and condenses light from the light source on a primary image-forming point that is an image of the light source, a deflector that scans light from the first lens group, and a second lens group that includes one or more lenses, has a positive focal length, and forms an image of light from the deflector at a position of a secondary image-forming point that is an image of the primary image-forming point. The first lens group forms the primary image-forming point between the first lens group and the second lens group along the optical axis.

An image projection system according to an embodiment of the present disclosure includes: a light source; a projection optical system that projects an image on the basis of light from the light source; and an eyepiece optical system for viewing of a projected image by the projection optical system. The projection optical system includes, in order from a side on which the light source is located to a projection side along an optical axis: a first lens group that includes one or more lenses, has a positive focal length, and condenses light from the light source on a primary image-forming point that is an image of the light source, a deflector that scans light from the first lens group, and a second lens group that includes one or more lenses, has a positive focal length, and forms an image of light from the deflector at a position of a secondary image-forming point that is an image of the primary image-forming point. The first lens group forms the primary image-forming point between the first lens group and the second lens group along the optical axis.

In the projection optical system, the image projection apparatus, or the image projection system according to the embodiment of the present disclosure, the primary image-forming point of the light source is formed, by the first lens group, between the first lens group and the second lens group.

According to the projection optical system, the image projection apparatus, or the image projection system according to the embodiment of the present disclosure, the primary image-forming point of the light source is formed, by the first lens group, between the first lens group and the second lens group, which makes it possible to provide a projection optical system, an image projection apparatus, or an image projection system having a small size, a light weight, and high resolution.

It is to be noted that effects described here are not necessarily limited and may include any of effects described in the present disclosure.

BRIEF DESCRIPTION OF THE DRAWINGS

FIG. 1 is a configuration diagram illustrating an outline of a projection optical system according to a comparative example.

FIG. 2 is a configuration diagram illustrating an outline of a projection optical system according to an embodiment of the present disclosure.

FIG. 3 is a configuration diagram illustrating outlines of a projection optical system and an image projection apparatus according to a first embodiment.

FIG. 4 is a characteristic diagram illustrating an example of changes in a projection distance and resolution in a projection optical system according to a second embodiment.

FIG. 5 is a configuration diagram illustrating an outline of a projection optical system according to a third embodiment.

FIG. 6 is a configuration diagram illustrating an outline of an image projection system according to a fourth embodiment.

FIG. 7 is a configuration diagram illustrating an outline of a projection optical system according to the fourth embodiment.

FIG. 8 is a characteristic diagram illustrating an example of defocusing characteristics of a beam diameter in a horizontal direction in proximity to a projection position by the projection optical system according to the fourth embodiment.

FIG. 9 is a characteristic diagram illustrating an example of defocusing characteristics of a beam diameter in a vertical direction in proximity to the projection position by the projection optical system according to the fourth embodiment.

FIG. 10 is an explanatory diagram schematically illustrating an example of a free-form surface in the projection optical system according to the fourth embodiment.

FIG. 11 is a characteristic diagram illustrating distortion characteristics of a two-dimensional image on a projection plane by the projection optical system according to the fourth embodiment.

FIG. 12 is a characteristic diagram illustrating an example of defocusing characteristics of a beam diameter in the horizontal direction in proximity to a projection position by a projection optical system according to a fifth embodiment.

FIG. 13 is a characteristic diagram illustrating an example of defocusing characteristics of a beam diameter in the vertical direction in proximity to the projection position by the projection optical system according to the fifth embodiment.

MODES FOR CARRYING OUT THE INVENTION

In the following, some embodiments of the present disclosure are described in detail with reference to the drawings. It is to be noted that description is given in the following order.

0. Outlines of Comparative Example and Embodiment
0.1 Comparative Example (Outline and Issues of Laser Scanning Projector) (FIG. 1)
0.2 Outline of Embodiment (FIG. 2)
1. First Embodiment (FIG. 3)
2. Second Embodiment (FIG. 4)
3. Third Embodiment (FIG. 5)
4. Fourth Embodiment (FIGS. 6 to 11)
5. Fifth Embodiment (FIGS. 12 and 13)
6. Other Embodiments 0. Outlines of Comparative Example and Embodiment 0.1 Comparative Example (Outline and Issues of Laser Scanning Projector)

A projection optical system, an imaging projection apparatus, and an image projection system according to an embodiment of the present disclosure may be applied to a laser scanning projector, for example. Description is given of an outline and issues of the laser scanning projector before description of outlines of the projection optical system, the image projection apparatus, and the image projection system according to the embodiment of the present disclosure.

FIG. 1 illustrates a schematic configuration of a laser scanning projector according to a comparative example.

The laser scanning projector according to the comparative example includes a light source LDa that emits laser light, and a projection optical system 100 that projects an image on a screen (a projection plane) on the basis of the laser light from the light source LDa. It is to be noted that the screen or the projection plane herein does not necessarily have substance such as a flat member for projection that is a general definition, and is broadly defined as a "plane perpendicular to an optical axis in an optical path subsequent to a deflector".

The projection optical system 100 includes one or more lenses L1 and a scanning mirror MM in order from a light source side to a projection side along an optical axis Z1.

In the laser scanning projector according to the comparative example, a laser light flux corresponding to one pixel is outputted in a substantially parallel state. A laser beam is gradually converged to a beam waist to have the smallest beam diameter at the beam waist, and is gradually diverged from the beam waist. A deflector (the scanning mirror MM) used to two-dimensionally scan an image is provided between a lens located closest to the projection plane and the projection plane. A device fabricated by MEMS (Microelectro-Mechanical Systems) technology, etc. is used for the scanning mirror MM of a small-sized laser scanning projector. For example, a size of the MEMS mirror is about φ 1 mm, for example. It is to be noted that φ represents a diameter.

In order to increase resolution of the projection optical system 100, it is necessary to increase a NA of the lens L1, thereby narrowing a beam. This means that a large light flux diameter proportional to a distance to the projection plane is necessary on the lens closest to the projection plane. Increasing a NA of the projection optical system 100 causes the size of the scanning mirror MM to become rate-limiting and limit the light flux diameter. In order to deviate from such limitation, it is necessary to increase the size of the scanning mirror MM; however, increasing a mirror size causes issues of a deterioration in response characteristics, upsizing of an apparatus, and an increase in cost.

PTL 1 (Japanese Unexamined Patent Application Publication No. 2015-179245) proposes that a collimator causes lasers of three colors to enter the scanning mirror in a substantially parallel light state, and the scanning mirror causes two-dimensionally scanned beams to enter a projection lens, thereby forming a primary projected image. In PTL 1, light spread from the primary projected image is converted into a parallel light flux by a microlens array, and thereafter, an image of the parallel light flux is formed on a retina of an eye as a secondary projected image. This makes it possible for a viewer to view an image.

In PTL 1, the NA determining resolution of the primary projected image is represented by the following expression (1), where R represents a diameter of a light flux entering the projection lens, and f represents a focal length of the projection lens.

$$NA = R/2f \qquad (1)$$

In order to optically increase resolution, it is necessary to increase the NA. As one method of increasing the NA, a method of increasing the light flux diameter R is adopted; however, it is difficult to increase the light flux diameter R because of the following reason.

In PTL 1, a parallel light flux does not have an intermediate image-forming point between the collimator and the projection lens between which a scanning unit is present, and in order to expand the light flux diameter, an effective diameter of a mirror of the scanning unit becomes rate-limiting, thereby causing issues similar to those in the laser scanning projector according to the comparative example in FIG. 1. As another method of increasing the NA, a method of decreasing the focal length f is adopted; however, a projection distance is shortened with a decrease in the focal length f, which disadvantageously causes a difficulty in layout of an optical element such as a mirror. In other words, optically increasing resolution with a configuration of an existing laser scanning projector disadvantageously causes upsizing of the apparatus or a decrease in the projection distance.

PTL 2 (Japanese Unexamined Patent Application Publication No. 2009-180821) proposes a laser scanning projector that makes it possible to constantly display a well-focused image even if a distance to the projection plane is changed by scanning of laser light having a certain spread angle similar to parallel light.

PTL 2 proposes to enlarge an image to have a spread angle α determined by an expression (2).

$$\alpha = \arctan((\tan(\theta/2)/(YN/2)) \tag{2}$$

where θ represents a diverging angle in a horizontal direction and a vertical direction of the scanning mirror, and YN represents the number of pixels in the vertical direction of a projected image.

In a case where the expression (2) is satisfied, it is possible to increase, at an equal rate, an image size and spread of a laser beam diameter that are increased with an increase in the distance to the projection plane; therefore, images on the screen constantly appear well-focused. This indicates a condition for satisfying focus-free that is a characteristic of the laser scanning projector.

Herein, a method of increasing resolution under the condition of the expression (2) is considered. In order to increase the resolution by N times (N>1), it is sufficient if the pixel number YN is increased by N times while a width of an image is kept fixed, that is, the beam diameter is decreased to 1/N. Hereinafter, a condition for keeping the width of the image fixed is considered assuming that the projection distance and the diverging angle θ of the scanning mirror are fixed. In a typical projector, a value inside parentheses in arctan of the expression (2) is sufficiently smaller than 1; therefore, it is considered that α and the value inside parentheses in arctan has a linear relationship for simplicity. In a case where the pixel number YN in the vertical direction is increased by N times to increase the resolution by N times, it is necessary to decrease the spread angle α of the beam to 1/N.

The spread angle and the beam diameter of the beam have a relationship of an expression (3), where λ represents a wavelength, and w represents a beam waist radius.

$$\alpha = \lambda/\pi\omega \tag{3}$$

From the expression (3), in a case where the spread angle α is decreased to 1/N, it is necessary to increase a beam diameter per pixel by N times. In other words, a condition for increasing the resolution by N times under the condition of the expression (2) is to increase the beam diameter by N times. However, this is incompatible with decreasing the foregoing beam diameter to 1/N, which means that it is not possible to increase the resolution unless deviated from a condition for achieving focus-free in the expression (2).

As described above, in the laser scanning projector, it is desirable to develop technology for optically achieving high resolution while enabling a long projection distance and downsizing of the apparatus and coping with deviation from the focus-free characteristics.

0.2 Outline of Embodiment

FIG. 2 illustrates a schematic configuration of a projection optical system 1 according to an embodiment of the present disclosure.

(Basic Configuration of Projection Optical System 1)

The projection optical system 1 includes a first lens group G1, a scanning mirror MM as a deflector that scans light from the first lens group G1, and a second lens group G2 in order from a side on which the light source LDa is located to a projection side along an optical axis Z1.

The first lens group G1 has a positive focal length as a whole. The first lens group G1 includes one or more lenses (for example, lenses L1 and L2), and condenses light from the light source LDa on a primary image-forming point that is an image of the light source LDa. It is to be noted that in FIG. 2, I1 represents an example of the primary image-forming point.

The second lens group G2 has a positive focal length as a whole. The second lens group G2 includes one or more lenses (for example, a lens L3), and forms an image of light from the scanning mirror MM at a position of a secondary image-forming point that is an image of the primary image-forming point. It is to be noted that in FIG. 2, I2 represents an example of the secondary image-forming point.

The first lens group G1 forms an intermediate image-forming point between the first lens group G1 and the second lens group G2 along the optical axis Z1. Disposing the scanning mirror MM in proximity to the primary image-forming point between the first lens group G1 and the second lens group G2 makes it possible to configure a small-sized optical system without limitation by an effective range of the scanning mirror MM.

Moreover, in the projection optical system 1, having the intermediate image-forming point makes it possible to set a NA at the primary image-forming point relatively freely. In other words, in the projection optical system 1, it is possible to increase an incident NA to the second lens group G2. In the projection optical system 1, it is possible to increase an exit NA of the second lens group G2 in accordance with the incident NA to the second lens group G2. Accordingly, a beam is eventually narrowed with a large NA at the secondary image-forming point that is the image of the primary image-forming point, which makes it possible to form an image having high resolution.

The following issue arises in a case where an image of light from the light source LDa is directly formed without having the intermediate image-forming point. In order to avoid interference with a beam in a scanning range of the scanning mirror MM, it is necessary to separate the light source LDa and the scanning mirror MM from each other by a certain distance. In order to colorize an image, light sources of three or more wavelengths are necessary as the light source LDa, and in order to scan three light sources by the scanning mirror MM after the three light sources have passed through a combined optical path, it is necessary to further separate the light source LDa and the scanning mirror MM from each other. Accordingly, enlarging the scanning mirror MM is the only way to increase resolution, which causes the same issues as those in the foregoing comparative example.

In other words, in the present technology, an essential condition is that the intermediate image-forming point as the primary image-forming point of the light source LDa is formed between the first lens group G1 and the second lens group G2.

As described above, according to the projection optical system 1, the intermediate image-forming point as the primary image-forming point is formed between the first lens group G1 and the second lens group G2 by the first lens group G1, which makes it possible to provide a projection optical system having a small size, a light weight, and high resolution. Moreover, using the projection optical system 1 makes it possible to provide an image projection apparatus or an image projection system having a small size, a light weight and high resolution.

It is to be noted that the effects described herein are merely illustrative and non-limiting, and other effects may be included. This applies to effects of the following other embodiments.

(Preferable Configuration of Projection Optical System 1)

The projection optical system 1 may have the following preferable configuration.

In the projection optical system 1, it is preferable to satisfy the following expression (an expression (7) to be described later) with a predetermined wavelength λ, where $f_2$ represents a focal length of the second lens group G2, $\omega_1$ represents a beam waist radius of the primary image-forming point, and $d_2$ represents a distance from the primary image-forming point to a front-side main point of the second lens group G2.

$$d_2 \geq f_2 + \pi \cdot \omega_1^2 / \lambda$$

where positions of the primary image-forming point and the secondary image-forming point in a case where a laser beam having a Gaussian distribution is used for the light source LDa are located at beam waist positions where a beam diameter is the smallest.

No issue arises if the scanning mirror MM is disposed in proximity to a beam waist subsequent to the first lens group G1 to allow the beam diameter spread by a distance from the beam waist to be smaller than an effective range of a mirror.

The laser beam having the Gaussian distribution is described below with a propagation expression in a case where the laser beam is propagated by a lens.

[Math. 1]

$$\omega_n = \frac{f_n \omega_{n-1}}{\sqrt{(d_n - f_n)^2 + \left(\frac{\pi \omega_{n-1}^2}{\lambda}\right)^2}}$$

$$d'_n = f_n + \left(\frac{\omega_n}{\omega_{n-1}}\right)^2 (d_n - f_n)$$

λ represents a wavelength, $\omega_1$ represents a beam waist radius of the primary image-forming point after passing through the first lens group G1, $\omega_2$ represents a beam waist radius of the secondary image-forming point after passing through the second lens group G2, and $f_2$ represents the focal length of the second lens group G2. Moreover, $d_2$ represents a distance from the primary image-forming point after passing through the first lens group G1 to the front-side main point of the second lens group G2, and $d_2'$ represents a projection distance from a rear-side main point of the second lens group G2 to the secondary image-forming point after passing through the second lens group G2.

[Math. 2]

$$\omega_2 = \frac{f_2 \omega_1}{\sqrt{(d_2 - f_2)^2 + \left(\frac{\pi \omega_1^2}{\lambda}\right)^2}}$$

$$d'_2 = f_2 + \left(\frac{\omega_2}{\omega_1}\right)^2 (d_2 - f_2)$$

The following expressions (4) and (5) are obtained by putting:

$$D = d_2 - f_2 (>0), \text{ and}$$

$$A = \pi \omega_1^2 / \lambda.$$

[Math. 3]

$$\omega_2 = \frac{f_2 \omega_1}{\sqrt{D^2 + A^2}} \quad (4)$$

$$d'_2 = f_2 + \frac{f_2^2 D}{D^2 + A^2} \quad (5)$$

Differential coefficients obtained by differentiating the expression (4) and the expression (5) with respect to D are respectively determined by an expression (4)' and an expression (5)'.

[Math. 4]

$$\frac{d\omega_2}{dD} = -\frac{f_2 \omega_1 D}{(D^2 + A^2)^{3/2}} \quad (4)'$$

$$\frac{dd'_2}{dD} = -\frac{f_2^2 (D - A)(D + A)}{(D^2 + A^2)^2} \quad (5)'$$

TABLE 1

| | 0 ≤ D < A | D = A | D > A |
|---|---|---|---|
| $\omega_2$ | ↘ | ↘ | ↘ |
| $d_2'$ | ↗ | Maximum Value | ↘ |

Table 1 illustrates changes in $\omega_2$ and $d_2'$ by a change in D. In a region of D≥0, $\omega_2$ monotonically decreases. $d_2'$ monotonically increases in D<A, takes a maximum value, in D=A, and monotonically decreases in D>A.

In order to optically increase resolution, it is only necessary to decrease the beam waist radius $\omega_2$ condensed by one pixel on the screen. The resolution increases with an increase in D; however, the projection distance d2' decreases in D>A. Accordingly, it is desirable to have balance between D and $d_2'$ in accordance with specifications.

The projection distance $d_2'$ takes a minimum value $f_2$ in D=0, and a maximum value $f_2 + f_2^2/2A$ in D=A, and takes a range of an expression (6).

$$f_2 \leq d_2' \leq f_2 + f_2^2 / 2A \quad (6)$$

It is possible to set the projection distance $d_2'$ within the range of the expression (6); however, $d_2'$ has a first solution D1 within a range of 0≤D<A and a second resolution D2 within a range of D>A, that is, $d_2'$ has two solutions in total.

The projection distance is the same in D1 and D2; however, a beam diameter exerting an influence on resolution in D1 is larger than that in D2. Accordingly, the resolution is optically higher in D2. In other words, satisfying the condition of D≥A makes it possible to optically achieve high resolution.

As described above, the conclusion is that a conditional expression related to D for increasing resolution in the projection optical system 1 is D≥A. The following is established from D=$d_2-f_2$ and A=$\pi\omega_1^2/\lambda$.

$$d_2-f_2 \geq \pi\omega_1^2/\lambda$$

$$d_2 \geq f_2 + \lambda\pi \cdot \omega_1^2/\lambda \quad (7)$$

Satisfying the expression (7) makes it possible to achieve a projector being compatible between maintaining a long projection distance and having high resolution.

The first lens group G1 preferably includes a combined lens of a positive lens and a negative lens. Laser light is condensed by the first lens group G1, and a combined lens of a positive lens and a negative lens for correction of chromatic aberration is used for a lens on a condensing side, which makes it possible to correct chromatic aberration at each of wavelengths of the light source LDa. A combination of glass lenses having Abbe numbers different between the positive lens and the negative lens is generally used for correction of chromatic aberration.

Moreover, the first lens group G1 may include only a plurality of positive single lenses, and correct axial chromatic aberration by adjustment of an interval between the light source LDa and the first lens group G1. In this case, the combined lens for correction of chromatic aberration is not used, which leads to an advantage of cost reduction. In this case, in a case where the first lens group G1 uses plastic lenses in place of glass lenses, a cost reduction effect is larger.

The second lens group G2 preferably includes a combined lens of a positive lens and a negative lens. Using a combined lens of one or more pairs of a positive lens and a negative lens subsequent to the scanning mirror MM makes it possible to correct chromatic aberration of magnification caused out of an axis. A preferable configuration of the above-described first lens group G1 makes it possible to correct axial chromatic aberration, but has a difficulty in correcting chromatic aberration over an entire off-axis angle of view. Accordingly, chromatic aberration is preferably corrected by the second lens group G2. Using the combined lens of one or more pairs of a positive lens and a negative lens for the second lens group G2 makes it possible to correct chromatic aberration at each of the wavelengths of the light source LDa.

Moreover, the second lens group G2 preferably has one or more transmission surfaces having a free-form surface shape. In a case where an axially symmetric lens is used for the second lens group G2, distortion is generated in a two-dimensionally scanned image. In a case where a lens having the free-form surface shape is used to optically correct distortion, a favorable image in which optical distortion is corrected is obtained.

With the basic configuration of the above-described projection optical system 1, the beam diameter corresponding to one pixel on the projection plane is decreased to increase resolution. However, as represented by the expression (3), the spread angle is increased with narrowing of the beam as characteristics of a Gaussian beam; therefore, a depth of focus is narrowed to be deviated from focus-free characteristics. Hence, focusing on a projection position may be performed through moving, in a direction along the optical axis Z1, one or more lenses of the lenses in the first lens group G1 and the lenses in the second lens group G2. This makes it possible to view an image constantly focused on the projection plane while increasing resolution.

Moreover, a projected image may be adjusted in a direction perpendicular to the optical axis Z1 through moving, in the direction perpendicular to the optical axis Z1, one or more lenses of the lenses in the first lens group G1 and the lenses in the second lens group G2. This makes it possible to move the projected image in a plane perpendicular to the optical axis Z1.

(Image Projection Apparatus)

The image projection apparatus may be configured with use of at least the light source LDa and the projection optical system 1 that appropriately satisfies the basic configuration and the preferable configuration described above.

(Image Projection System)

The image projection system may be configured with use of at least the light source LDa, the projection optical system 1 that appropriately satisfies the basic configuration and the preferable configuration described above, and an eyepiece optical system for viewing of a projected image by the projection optical system 1.

In the following, description is given of more specific embodiments that appropriately satisfy the basic configuration and the preferable configuration of the foregoing projection optical system 1. It is to be noted that in the following, substantially same components as those of the foregoing projection optical system 1 are denoted by same reference numerals, and description thereof is omitted where appropriate.

1. First Embodiment

FIG. 3 illustrates schematic configurations of a projection optical system 1A and an image projection apparatus 10 according to a first embodiment of the present disclosure.

The image projection apparatus 10 according to the present embodiment includes the light source LDa, the projection optical system 1A, and a controller 11.

The projection optical system 1A includes the first lens group G1, the scanning mirror MM, and the second group G2 in order from the side on which the light source LDa is located to the projection side along the optical axis Z1.

The first lens group G1 includes the lenses L1 and L2. The second lens group G2 includes the lens L3.

The controller 11 includes a light source controller 12 and a scanning controller 13. The light source controller 12 performs light emission control of the light source LDa on the basis of image data. The scanning controller 13 controls a scanning direction and a scanning timing by the scanning mirror MM on the basis of the image data.

For example, a small-sized LD (Laser Diode) is usable for the light source LDa. In place of the LD, a light-emitting diode (LED) may be used for the light source LDa.

The light source LDa outputs intensity-modulated laser light on the basis of the image data. The laser light from the light source LDa is converted into substantially parallel light by the lens L1 of the first lens group G1. Thereafter, the substantially parallel light is condensed by the lens L2 of the first lens group G1 to form the primary image-forming point between the first lens group G1 and the second lens group G2 along the optical axis Z1.

Both the lens L1 and the lens L2 are lenses having a positive focal length, and a focal length of the first lens group G1 including a combination of these lenses also has a positive value. The scanning mirror MM is located in proximity to the primary image-forming point subsequent to the first lens group G1. As the scanning mirror MM, it is possible to use an MEMS mirror that is allowed to two-dimensionally perform deflection scanning. It is not necessary for a position of the primary image-forming point to be the same as a position of the scanning mirror MM. Even in a case where the scanning mirror MM is displaced from the position of the primary image-forming point, no issue arises if magnitude of spread of a light flux from the primary image-forming point is equal to or smaller than the effective diameter of the scanning mirror MM. Reducing a distance from the scanning mirror MM to the primary image-forming point makes it possible to decrease the effective diameter of the scanning mirror MM, which results in advantages of downsizing of the apparatus and prevention of a deterioration in mirror characteristics, and prevention of an increase in cost. In the projection optical system 1A, it is possible to increase the NA at the primary image-forming point by the lens L2, which makes it possible to increase the NA on an exit side of the second lens group G2.

The lens L3 has a positive focal length, and the second lens group G2 also has a positive focal length as a whole. Light two-dimensionally scanned by the scanning mirror MM is projected on the projection plane 2 by the lens L3 of the second lens group G2. Herein, the projection plane 2 indicates a plane that is located at or in proximity to a beam waist, as the secondary image-forming point, after passing through the second lens group G2 and is perpendicular to the optical axis Z1. This makes it possible to view a two-dimensional image on the projection plane 2. In order to optically achieve higher resolution, it is necessary to increase the NA. Accordingly, a large light flux diameter is necessary in the lens L3 located closest to the projection plane 2.

Modification Example

As a modification example of the first embodiment, a pin hole may be provided at the position of the primary image-forming point, and may serve as a replacement for the primary image-forming point. Decreasing a diameter of the pin hole makes it possible to increase the NA, which makes it possible to adjust resolution in accordance with specifications. In the modification example, it is only necessary to provide the pin hole, and adjustment of assembly of the first lens group G1 is unnecessary, which results in an advantage in that it is possible to largely reduce and simplify a workload during manufacturing.

2. Second Embodiment

Next, description is given of a projection optical system and an image projection apparatus according to a second embodiment of the present disclosure. It is to be noted that in the following, substantially same components as those of the projection optical system and the image projection apparatus according to the foregoing first embodiment are denoted by same reference numerals, and description thereof is omitted where appropriate.

Configurations of the projection optical system and the image projection apparatus according to the present embodiment may be substantially similar to those of the projection optical system 1A and the image projection apparatus 10 illustrated in FIG. 3.

In the present embodiment a more specific numerical example of the projection optical system 1A illustrated in FIG. 3 is provided. Table 2 illustrates a specific numerical example.

TABLE 2

| Lens Group | Optical Element | f | s | ω | d' |
|---|---|---|---|---|---|
| | LDa | | 2.185 | 0.0011 | |
| G1 | L1 | 2.0 | 20.000 | 0.0124 | 23.540 |
| | L2 | 5.7 | 33.058 | 0.0076 | 2.218 |
| G2 | L3 | 28.0 | | 0.0744 | 300 |

In Table 2, f represents a focal length of a lens, s represents a distance from a certain optical element to an optical element subsequent to the certain optical element, w represents a radius of a beam waist after passing through the optical element, and d' represents a distance from the optical element to the beam waist. A wavelength of the light source LDa is 525 nm. At the lens L2, d'<s is established; therefore, a beam waist is present between the lens L2 and the lens L3. In other words, the primary image-forming point is present between the first lens group G1 and the second lens group G2, and the numerical example satisfies the basic configuration of the foregoing projection optical system 1.

In a case where $f_2$ represents the focal length of the second lens group G2, $\omega_1$ represents a beam waist radius of the primary image-forming point after passing through the first lens group G1, $d_2$ represents a distance from the primary image-forming point to the front-side main point of the second lens group G2, and $\lambda$ represents a wavelength, the following is established in the numerical example in Table 2.

$f_2 = 28.0$
$\omega_1 = 0.0076$
$\lambda = 0.000525$
$f_2 + \pi \cdot \omega_1^2 / \lambda = 28.346$ (round off the number to the third decimal place)

$d_2$ is a value obtained through subtracting the distance d'=2.218 to the beam waist after passing through the lens L2 from a distance s=30.058 from the lens L2 to the lens L3. That is, d2=30.058−2.218=30.84 is established, which satisfies the foregoing expression (7).

FIG. 4 illustrates an example of changes in the projection distance and resolution in the projection optical system 1A.

FIG. 4 illustrates a graph illustrating changes in $d_2'$ and $\omega_2$ with respect to D in a case of $D = d_2 - f_2$ (>0) and $A = \pi \omega_1^2 / \lambda$, where $d_2'$ represents a projection distance from the rear-side main point of the second lens group G2 to the projection plane 2. In the present embodiment, D=2.84 and A=0.35 are established, and d2' is maximized while taking a largest-possible value within a range of D≥A, thereby achieving a design in which the projection distance is well-balanced with resolution.

Next, a case where the wavelength of the light source LDa is changed is considered. In general, a beam to be narrowed becomes large with an increase in wavelength. Accordingly, a numerical value is increased with an increase in wavelength by an influence of the second term on the right side of the expression (7). Hence, if the longest wavelength of used wavelengths satisfies the expression (7), a shorter wavelength satisfies the expression (7) at the same time. For example, in a case where LDs of three kinds of wavelengths, that is, a red light source of 640 nm, a green light source of 525 nm, and a blue light source of 445 nm are used as the light source LDa, if red of 640 nm satisfies the expression (7), the wavelengths of 525 nm and 445 nm also satisfy the expression (7) at the same time. Note that as with the modification example of the foregoing first embodiment, in a case where a pin hole is provided at the position of the primary image-forming point, irrespective of wavelengths, $\omega_1$ has a substantially same value; therefore, the above-described relation is reversed, and in the expression (7), the numerical value is increased with a decrease in wavelength. Hence, in this case, if the shortest wavelength of the used wavelengths satisfies the expression (7), a longer wavelength also satisfies the expression (7) at the same time. For example, if 445 nm of the blue light source satisfies the expression (7), the wavelengths of 640 nm and 525 nm also satisfy the expression (7) at the same time.

Other configurations, operations, and effects may be substantially similar to those in the projection optical system 1A and the image projection apparatus 10 according to the foregoing first embodiment.

3. Third Embodiment

Next, description is given of a projection optical system and an image projection apparatus according to a third embodiment of the present disclosure. It is to be noted that in the following, substantially same components as those of the projection optical system and the image projection apparatus according to the foregoing first or second embodiment are denoted by same reference numerals, and description thereof is omitted where appropriate.

FIG. 5 illustrates a schematic configuration of a projection optical system 1B according to the third embodiment of the present disclosure.

The projection optical system 1B is configured to project a color image. It is necessary to use a plurality of laser light sources for projection of a color image. For example, it is possible to form a color image with use of, as the light source LDa, light sources of three colors, that is, a red (R) light source LDr, a green (G) light source LDg, and a blue (B) light source LDb. In this case, a synthesis optical system for synthesis of light from the respective light sources is necessary. The red light source LDr includes, for example, an LD of a wavelength of 640 nm, the green light source LDg includes, for example, an LD of a wavelength of 525 nm, and the blue light source LDb includes, for example, an LD of a wavelength of 445 nm.

The first lens group G1 includes lenses L1R, L1G, and L1B, and the lens L2. The lenses L1R, L1G, and L1B have a function of converting light of each of the wavelengths into parallel light. The lens L1R serves as a collimator for the red light source LDr. The lens L1G serves as a collimator for the green light source LDg. The lens L1B serves as a collimator for the blue light source LDb.

In the present embodiment, light from the respective light sources is synthesized with use of a mirror M1 and dichroic mirrors M2 and M3 as the synthesis optical system to be on the same optical axis, and thereafter the synthesized light is caused to enter the lens L2. The dichroic mirrors M2 and M3 may include a dichroic prism.

The mirror M1 is disposed on an optical axis Z1R of the red light source LDr and the lens L1R. The mirror M1 reflects red laser light.

The dichroic mirror M2 is disposed on an optical axis Z1G of the green light source LDg and the lens L1G. The dichroic mirror M2 reflects green laser light, and allows the red laser light to pass therethrough.

The dichroic mirror M3 is disposed on an optical axis Z1B of the blue light source LDb and the lens L1B. The dichroic mirror M3 reflects the red laser light and green laser light, and allows blue laser light to pass therethrough.

The lens L2 condenses the parallel light from the lenses L1R, L1G, and L1B to form a primary image of the parallel light. The light from the lens L2 is subjected to two-dimensional deflection scanning by the scanning mirror MM to be projected at a projection position through the second lens group G2.

In the projection optical system 1B according to the present embodiment, an issue of the chromatic aberration on the projection plane 2 where an image is displayed may be solved by the following method. For example, chromatic aberration may be reduced with use of a combined lens of a positive lens and a negative lens for the lens 2. It is desirable to use a cemented lens of glass lenses having different chromatic dispersion.

As a method that is different from the above-described method, allows for reduction in chromatic aberration, and is effective for cost reduction, a plastic single lens may be used for the lens L2. Correction is performed through generating chromatic aberration in a direction opposite to chromatic aberration generated in the first lens group G1 and second lens group G2, thereby correcting chromatic aberration in total. In order to generate desired chromatic aberration in the first lens group G1, it is sufficient if one or more of a distance from the lens L1R to the red light source LDr, a distance from the lens L1G to the green light source LDg, and a distance from the lens L1B to the blue light source LDb are adjusted to change a position of a primary image-forming point of each of the wavelengths subsequent to the lens L2, that is, a position of a primary image-forming point of each of the light sources.

Other configurations, operations, and effects may be substantially similar to those in the projection optical system and the image projection apparatus according to the foregoing first or second embodiment.

4. Fourth Embodiment

Next, description is given of a projection optical system and an image projection apparatus according to a fourth embodiment of the present disclosure. It is to be noted that in the following, substantially same components as those of the projection optical system and the image projection apparatus according to any of the foregoing first to third embodiments are denoted by same reference numerals, and description thereof is omitted where appropriate.

FIG. 6 illustrates a schematic configuration of an image projection system 20 according to the fourth embodiment.

The image projection system 20 according to the present embodiment includes an image projection apparatus 10A having a projection optical system 1C, and an eyepiece optical system 21 for viewing of a projected image by the projection optical system 1C.

In the present embodiment, an image size on the projection plane 2 of the projection optical system 1C is, for example, 24 mm×18 mm. An oscillation angle of the scanning mirror MM in the projection optical system 1C is set to achieve the above-described image size. In the present embodiment, a throw ratio defined by (a projection distance)/(a width of an image to be projected) is set to 17.1, which is extremely large, as compared with a typical projector. As application of a projector having such an extremely large throw ratio, for example, a projector for projection of an eyeglass type display, specifically, a display of a type in which an image projection unit and an eyeglass unit are separated is considered. Projecting an image of the projector at a front-side focal position of the eyepiece optical system 21 disposed in the eyeglass unit of a viewer of an image makes it possible to directly project an image on a retina of the viewer. It is necessary to narrow a beam diameter per pixel because of a small image size. Accordingly, technology for higher resolution according to the present disclosure is effective.

The eyepiece optical system 21 includes a refractive eyepiece lens using, for example, a glass material, etc. The eyepiece optical system 21 may include a diffractive eyepiece lens using a volume type HOE (Holographic Optical Element). In a case where the volume type HOE is used for the eyepiece lens, it is possible to achieve, by wavelength selectivity, a characteristic in which light of a wavelength other than the wavelength of the light source is allowed to pass therethrough as it is. This makes it possible to view a projected image of the projector in a see-through state.

FIG. 7 illustrates a schematic configuration of the projection optical system 1C.

The projection optical system 1C is configured to project a color image. In order to project a color image, it is necessary to use a plurality of laser light sources. For example, it is possible to form a color image with use of light sources of three colors, that is, the red light source LDr, the green light source LDg, and the blue light source LDb. In this case, a synthesis optical system for synthesis of light from the respective light sources is necessary. The red light source LDr includes, for example, an LD of a wavelength of 640 nm, the green light source LDg includes, for example, an LD of a wavelength of 525 nm, and the blue light source LDb includes, for example, an DL of a wavelength of 445 nm. An radiation angle of the green light source LDg is, for example, 22° in the horizontal direction (an X direction) and 12° in the vertical direction (a Y direction).

The first lens group G1 includes the lenses L1R, L1G, and L1B, and the lens L2. The lenses L1R, L1G, and L1B have a function of converting light of each of the wavelengths into parallel light. The lens L1R serves as a collimator for the red light source LDr. The lens L1G serves as a collimator for the green light source LDg.

The lens L1B serves as a collimator for the blue light source LDb.

In the present embodiment, light from the respective light sources is synthesized with use of the mirror M1 and the dichroic mirrors M2 and M3 as the synthesis optical system to be on the same optical axis, and thereafter the synthesized light is caused to enter the lens L2. The dichroic mirrors M2 and M3 may include a dichroic prism.

The mirror M1 is disposed on the optical axis Z1R of the red light source LDr and the lens L1R. The mirror M1 reflects red laser light.

The dichroic mirror M2 is disposed on the optical axis Z1G of the green light source LDg and the lens L1G. The dichroic mirror M2 reflects green laser light, and allows the red laser light to pass therethrough.

The dichroic mirror M3 is disposed on the optical axis Z1B of the blue light source LDb and the lens L1B. The dichroic mirror M3 reflects the red laser light and green laser light, and allows blue laser light to pass therethrough.

The lens L2 condenses the parallel light from the lenses L1R, L1G, and L1B to form a primary image of the parallel light. In order to determine the NA of the optical system, for example, a circular aperture of φ 1 mm may be provided between the dichroic mirror M3 and the lens L2. In the present embodiment, chromatic aberration is corrected with use of a combined lens of a positive lens and a negative lens for the lens L2.

The second lens group G2 includes the lens L3 and a lens L4. For the lens L3, a combined lens of a positive lens and a negative lens is used. This reduces off-axis chromatic aberration of magnification.

In the present embodiment, two-dimensional scanning is performed with use of a MEMS mirror as the scanning mirror MM. Scanning in a first scanning direction is performed by resonance motion, and scanning in a second direction is performed by non-resonance motion, where the first scanning direction represents the horizontal direction, and the second scanning direction represents the vertical direction. A horizontal axis indicates the horizontal direction, and a vertical axis indicates the vertical direction.

Table 3 illustrates optical path data from the red light source LDr to the scanning mirror MM. Table 4 illustrates optical path data from the green light source LDg to the scanning mirror MM. Table 5 illustrates optical path data from the blue light source LDb to the scanning mirror MM. Table 6 illustrates optical path data from the scanning mirror MM to the projection plane 2. In Tables 3 to 6, in a case of a mirror, "Plane" is entered in "Planar Shape". Moreover, in a case of a lens, any of kinds of lens shapes, that is, "Spherical Surface", "Aspherical Surface", and "Free-form Surface" is entered in "Planar Shape". A rotation angle (degrees) of an optical plane around a direction perpendicular to a plane including the optical axis Z1 and the first scanning direction as a rotation axis is entered in "ADE". A value (mm) of a radius of curvature is entered in "R". "INF" in "R" represents a plane, a virtual plane, etc. A value (mm) of an interval between adjacent surfaces on the optical axis is entered in "Surface Separation". A value of a refractive index, at a d-line (a wavelength of 587.6 nm), of an optical element is entered in "nd". A value of an Abbe number, at the d-line, of the optical element is entered in "vd".

Table 7 illustrates values of coefficients of aspherical surface shapes of both surfaces of the lens L1R. Table 8 illustrates values of coefficients of aspherical surface shape of both surfaces of the lens L1G. Table 9 illustrates values of coefficients of aspherical surface shapes of both surfaces of the lens L1B. Table 10 illustrates value of coefficients of free-form surface shapes of both surfaces of the lens L4. In Tables 7 to 19, R1 represents a surface on a light source side, and R2 represents a surface on a projection plane side.

Herein, the "Aspherical Surface Shape" means a surface shape that is rotationally symmetric, but not spherical. The "Free-form Surface" means a non-rotationally symmetric surface, and is herein represented by an XY polynomial. An expression (8) indicates an expression representing the aspherical surface shape, and an expression (9) indicates an expression representing the free-form surface shape, where k is a conic constant, r is a radial distance from a surface center, z is a sag amount of a surface parallel to the optical axis, and c is a curvature at a surface apex.

[Math. 5]

$$z = \frac{cr^2}{\sqrt{1-(1+k)c^2r^2}} + A_4 r^4 + A_6 r^6 + A_8 r^8 + A_{10} r^{10} \tag{8}$$

[Math. 6]

$$z = \frac{cr^2}{\sqrt{1-(1+k)c^2r^2}} + \sum_{j=2}^{66} C_j x^m y^n \tag{9}$$

$$j = \frac{(m+n)^2 + m + 3n}{2} + 1$$

TABLE 3

LDr - MM

| Surface No. | Lens Group | Optical Element | Planar Shape | R (mm) | Surface Separation (mm) | nd | vd | ADE (degrees) |
|---|---|---|---|---|---|---|---|---|
| 0 | (Light Source) | LDr | | INF | 0.971 | | | |
| 1 | G1 | L1R | Aspherical Surface | 2.222 | 2 | 1.509203 | 56.53 | |
| 2 | | | Aspherical Surface | −1.299 | 7.238 | | | |
| 3 | | M1 | Plane | INF | 12 | | | −45 |
| 4 | | M3 | Plane | INF | 5 | | | 45 |
| 5 | | L2 | Spherical Surface | 2.7 | 2.5 | 1.65844 | 50.88 | |
| 6 | | | Spherical Surface | −2.7 | 1 | 1.834 | 37.16 | |
| 7 | | | Spherical Surface | 15.255 | 7.991 | | | |
| 8 | | MM | Plane | INF | | | | −44 |

TABLE 4

LDg - MM

| Surface No. | Lens Group | Optical Element | Planar Shape | R (mm) | Surface Separation (mm) | nd | vd | ADE (degrees) |
|---|---|---|---|---|---|---|---|---|
| 0 | (Light Source) | LDg | | INF | 0.906 | | | |
| 1 | G1 | L1G | Aspherical Surface | 1.923 | 2 | 1.509203 | 56.53 | |
| 2 | | | Aspherical Surface | −1.291 | 7.238 | | | |
| 3 | | M2 | Plane | INF | 6 | | | −45 |
| 4 | | M3 | Plane | INF | 5 | | | 45 |
| 5 | | L2 | Spherical Surface | 2.7 | 2.5 | 1.65844 | 50.88 | |
| 6 | | | Spherical Surface | −2.7 | 1 | 1.834 | 37.16 | |
| 7 | | | Spherical Surface | 15.255 | 7.991 | | | |
| 8 | | MM | Plane | INF | | | | −44 |

TABLE 5

LDb - MM

| Surface No. | Lens Group | Optical Element | Planar Shape | R (mm) | Surface Separation (mm) | nd | vd | ADE (degrees) |
|---|---|---|---|---|---|---|---|---|
| 0 | (Light Source) | LDb | | INF | 0.993 | | | |
| 1 | G1 | L1B | Aspherical Surface | 2.207 | 2 | 1.509203 | 56.53 | |
| 2 | | | Aspherical Surface | −1.350 | 7.238 | | | |
| 3 | | | | | | | | |
| 4 | | M3 | Plane | INF | 5 | | | 45 |
| 5 | | L2 | Spherical Surface | 2.7 | 2.5 | 1.65844 | 50.88 | |
| 6 | | | Spherical Surface | −2.7 | 1 | 1.834 | 37.16 | |
| 7 | | | Spherical Surface | 15.255 | 7.991 | | | |
| 8 | | MM | Plane | INF | | | | −44 |

TABLE 6

MM - Projection Plane

| Surface No. | Lens Group | Optical Element | Planar Shape | R (mm) | Surface Separation (mm) | nd | vd | ADE (degrees) |
|---|---|---|---|---|---|---|---|---|
| 8 | | MM | Plane | INF | 13.491 | | | −44 |
| 9 | G2 | L3 | Spherical Surface | −138.106 | 1.6 | 1.654115 | 39.68 | |
| 10 | | | Spherical Surface | 9.385 | 6.76 | 1.496999 | 81.54 | |
| 11 | | | Spherical Surface | −11.710 | 5.162 | | | |
| 12 | | L4 | Free-form Surface | −14.648 | 3 | 1.509203 | 56.53 | |
| 13 | | | Free-form Surface | −8.963 | 410 | | | |
| 14 | | (Projection Plane) | Plane | INF | | | | |

TABLE 7

L1R • Aspherical Surface Shape

| | R1 | R2 |
|---|---|---|
| R | 2.22199 | −1.29943 |
| k | 0 | 0 |
| A4 | −2.67457E−01 | 3.10031E−02 |
| A6 | 9.84548E−01 | 1.77315E−02 |
| A8 | −3.62906E+00 | 2.05709E−02 |
| A10 | 8.17373E+00 | −2.01289E−02 |

TABLE 8

L1G • Aspherical Surface Shape

| | R1 | R2 |
|---|---|---|
| R | 1.9231 | −1.29056 |
| k | 0 | 0 |
| A4 | −3.44774E−01 | 3.10125E−02 |
| A6 | 1.38887E+00 | 1.93914E−02 |
| A8 | −5.61328E+00 | 1.94539E−02 |
| A10 | 1.30538E+01 | −2.06866E−02 |

TABLE 9

L1B • Aspherical Surface Shape

| | R1 | R2 |
|---|---|---|
| R | 2.20693 | −1.35044 |
| k | 0 | 0 |
| A4 | −2.85229E−01 | 2.58705E−02 |
| A6 | 8.75253E−01 | 1.67201E−02 |
| A8 | −2.91806E+00 | 8.47174E−03 |
| A10 | 2.62849E+00 | −1.10125E−02 |

TABLE 10

L4 • Free-form Surface Shape

| Coefficient | Alias | R1 | R2 |
|---|---|---|---|
| R | R | −14.64813991 | −8.96277205 |
| C1 | k | 7.017049E−03 | −3.163105E−01 |
| C2 | X | 1.377367E−02 | 1.316788E−02 |
| C4 | X2 | 2.092779E−02 | 3.010723E−02 |
| C6 | Y2 | 3.355884E−02 | 4.183012E−02 |
| C7 | X3 | −1.852425E−04 | −1.578990E−04 |

TABLE 10-continued

L4 • Free-form Surface Shape

| Coefficient | Alias | R1 | R2 |
|---|---|---|---|
| C9 | XY2 | −2.423261E−03 | −2.178551E−03 |
| C11 | X4 | −1.759327E−04 | −8.000437E−05 |
| C13 | X2Y2 | −1.186193E−04 | 3.206147E−05 |
| C15 | Y4 | 2.012919E−05 | 8.238114E−05 |
| C16 | X5 | 5.097167E−06 | 3.830976E−06 |
| C18 | X3Y2 | −3.528564E−05 | −2.467413E−05 |
| C20 | XY4 | −4.533595E−05 | −3.682529E−05 |
| C22 | X6 | 3.918957E−06 | 2.899689E−06 |
| C24 | X4Y2 | 1.127254E−05 | 8.730492E−06 |
| C26 | X2Y4 | 1.068674E−05 | 9.535164E−06 |
| C28 | Y6 | −2.100713E−07 | 3.545363E−08 |
| C29 | X7 | −3.155964E−08 | −1.992421E−08 |
| C31 | X5Y2 | −3.332736E−07 | −3.474137E−07 |
| C33 | X3Y4 | −1.496163E−07 | −4.856612E−07 |
| C35 | XY6 | 3.378643E−07 | 2.068281E−07 |
| C37 | X8 | −3.919494E−08 | −2.224543E−08 |
| C39 | X6Y2 | −6.467347E−08 | −2.454942E−08 |
| C41 | X4Y4 | −1.671423E−07 | −6.136823E−08 |
| C43 | X2Y6 | −9.063788E−09 | 7.511125E−09 |
| C45 | Y8 | −2.204509E−09 | 8.154143E−10 |

FIG. 8 illustrates an example of defocusing characteristics of a beam diameter in the horizontal direction in proximity to the projection position by the projection optical system 1C. FIG. 9 illustrates an example of defocusing characteristics of a beam diameter in the vertical direction in proximity to the projection position by the projection optical system 1C. The beam diameters are calculated with use of optical simulation software "CODE V". A wavelength is 525 nm that is green. In FIGS. 8 and 9, a horizontal axis indicates a defocusing amount ΔZ of a screen, and a vertical axis indicates the beam diameter. The beam diameter indicates a beam width [mm] at a position where a peak intensity value of a beam is $1/e^2$. ΔZ represents a defocusing amount [mm] of the screen, where a traveling direction of a light beam from the light source to the secondary image-forming point along the optical axis is plus.

From FIGS. 8 and 9, a minimum beam diameter in the horizontal direction and a minimum beam diameter in the vertical direction are φ 0.072 mm and φ 0.082 mm, respectively. Moreover, for comparison, a beam diameter in a case where light from a light source is projected as parallel light by a collimator in an existing projector optical system is determined by calculation simulation. In a case where a distance from the collimator to the projection plane 2 is 410 mm that is substantially similar to that in the present embodiment, the beam diameter on the projection plane 2 is about φ 1 mm. In contrast, in the projection optical system 1C according to the present embodiment, the beam diameter is narrowed to 1/10 or less. Accordingly, an effect of increasing resolution is confirmed.

FIG. 10 schematically illustrates the free-form surface shape of the lens L4 in the projection optical system 1C. In the projection optical system 1C, as illustrated in Tables 6 and 10, both surfaces of the lens L4 are transmission surfaces having the free-form surface shape. In FIG. 10, the X axis and the Y axis respectively indicate the horizontal direction and the vertical direction, and both surfaces of the lens L4 are symmetrical to the X axis and asymmetrical to the Y axis. In general, it is known that projection on a flat screen by a two-dimensional mirror causes distortion in a two-dimensional image. Using the lens having the free-form surface shape for the lens L4 makes it possible to correct distortion in the image.

FIG. 11 illustrates distortion characteristics of the two-dimensional image on the projection plane 2 by the projection optical system 1C.

FIG. 11 illustrates a beam image-forming position on the projection plane 2 corresponding to each of oscillation angles that divide a scanning range of the scanning mirror MM. It can be seen that distortion in the image is corrected extremely well.

Other configurations, operations, and effects may be substantially similar to those in the projection optical system and the image projection apparatus according to any of the foregoing first to third embodiments.

5. Fifth Embodiment

Next, description is given of a projection optical system and an image projection apparatus according to a fifth embodiment of the present disclosure. It is to be noted that in the following, substantially same components as those of the projection optical system and the image projection apparatus according to any of the foregoing first to fourth embodiments are denoted by same reference numerals, and description thereof is omitted where appropriate.

In the projection optical system 1C in FIG. 7, focusing on the projection position may be performed through moving, in the direction along the optical axis Z1, one or more lenses of the lenses in the first lens group G1 and the lenses in the second lens group G2. Moreover, a projected image may be adjusted in the direction perpendicular to the optical axis Z1 through moving, in the direction perpendicular to the optical axis Z1, one or more lenses of the lenses in the first lens group G1 and the lenses in the second lens group G2.

For example, as illustrated in FIG. 7, driving the lens L2 in the direction along the optical axis Z1 makes it possible to change the focal position of the secondary image-forming point. In the present embodiment, the lens L2 is driven; however, any other single lens, or two or more lenses may be driven. Light incident on the lens L2 is substantially parallel light; therefore, image-forming performance of the primary image-forming point is hardly deteriorated even if the lens L2 is driven in the direction along the optical axis Z1. In a case where the lens L2 is driven along the optical axis Z1, the beam diameter on a surface of the scanning mirror MM is changed; however, no issue arises if a maximum value of the beam diameter in a driving range of the lens L2 is designed to be smaller than the effective diameter of the scanning mirror MM.

It is to be noted that conditions such as the surface shape of the optical element, the wavelength of the light source, and the radiation angle of the light source in the projection optical system 1C may be substantially similar to those in the foregoing fourth embodiment.

FIG. 12 illustrates an example of defocusing characteristics of the beam diameter in the horizontal direction in proximity to the projection position by the projection optical system according to the present embodiment. FIG. 13 illustrates an example of defocusing characteristics of the beam diameter in the vertical direction in proximity to the projection position by the projection optical system according to the present embodiment. FIGS. 12 and 13 illustrate the defocusing characteristics of the beam diameter at a center of a screen in a case where the lens L2 is driven by an amount of ΔZL. The wavelength is 525 nm that is green. The beam diameters are calculated with use of optical simulation software "CODE V". ΔZL represents a driving amount [mm] along the optical axis Z1 of the lens L2. In FIGS. 12 and 13, a horizontal axis indicates the defocusing amount ΔZ, and a vertical axis indicates the beam diameter. The beam diameter indicates a beam width [mm] at a position where a peak intensity value of a beam is $1/e^2$. ΔZ represents a defocusing amount [mm] of a screen, where a light source side is minus with reference to the position of the projection plane 2 in Table 6. In both ΔZL and ΔZ, a traveling direction of a light beam from the light source to the secondary image-forming point along the optical axis is plus.

Driving the lens L2, that is, changing ΔZL makes it possible to move a minimum position of the beam diameter, that is, a focused plane, which makes it possible to constantly display a sharp image having high resolution. On this occasion, the scanning mirror MM is disposed at a front-side focal position of the second lens group G2 to cause the scanning mirror to provide a telecentric optical system, which makes it possible to eliminate change in magnification of an image caused by movement in the optical axis direction of the projection plane 2. In a case where it is not possible to provide the telecentric optical system because of limitation on the size of the optical system, change in magnification of the image caused by movement in the optical axis direction of the projection plane 2 is caused; however, the position of the projection plane 2 and a scaling factor are included in numerical information that are known in advance. Accordingly, image processing of correcting magnification of an original image in accordance with the position of the projection plane 2 allows an image to be displayed as if magnification does not change.

Moreover, driving the lens L2 in the plane perpendicular to the optical axis Z1 makes it possible to drive the primary image-forming point in the plane perpendicular to the optical axis Z1, thus making it possible to adjust the secondary image-forming point that is the image of the primary image-forming point in the direction perpendicular to the optical axis Z1. In a case where the lens L2 is driven in the direction perpendicular to the optical axis Z1, a beam position is changed on the surface of the scanning mirror MM; however, no issue arises if an end of the beam diameter within the driving range of the lens L2 is designed to be located inside the effective diameter of the scanning mirror MM. The magnitude of a driving amount is supposed to be determined to an extent that deterioration in off-axis characteristics by lens driving do not become extremely large.

Other configurations, operations, and effects may be similar to those in the projection optical system and the image projection apparatus according to any of the foregoing first to fourth embodiments.

6. Other Embodiments

The technology according to the present disclosure is not limited to the respective embodiments described above, and may be modified in a variety of ways.

For example, the present technology may have the following configurations.

(1)

A projection optical system including, in order from a side on which a light source is located to a projection side along an optical axis:

a first lens group that includes one or more lenses, has a positive focal length, and condenses light from the light source on a primary image-forming point that is an image of the light source;

a deflector that scans light from the first lens group; and a second lens group that includes one or more lenses, has a positive focal length, and forms an image of light from the deflector at a position of a secondary image-forming point that is an image of the primary image-forming point, and the first lens group forming the primary image-forming point between the first lens group and the second lens group along the optical axis.

(2)

The projection optical system according to (1), in which a following expression is satisfied with a predetermined wavelength $\lambda$, where $f_2$ represents a focal length of the second lens group, wi represents a beam waist radius of the primary image-forming point, and $d_2$ represents a distance from the primary image-forming point to a front-side main point of the second lens group:

$$d_2 \geq f_2 + \pi \cdot \omega_1^2 / \lambda.$$

(3)

The projection optical system according to (1) or (2), in which the first lens group includes a combined lens of a positive lens and a negative lens.

(4)

The projection optical system according to (1) or (2), in which the first lens group includes only a plurality of positive single lenses, and axial chromatic aberration is corrected through adjusting an interval between the light source and the first lens group.

(5)

The projection optical system according to any one of (1) to (4), in which the second lens group includes a combined lens of a positive lens and a negative lens.

(6)

The projection optical system according to any one of (1) to (5), in which the second lens group has one or more transmission surfaces having a free-form surface shape.

(7)

The projection optical system according to any one of (1) to (6), in which one or more lenses of the lens in the first lens group and the lens in the second lens group are moved in a direction along the optical axis to perform focusing on a projection position.

(8)

The projection optical system according to any one of (1) to (7), in which one or more lenses of the lens in the first lens group and the lens in the second lens group are moved in a direction perpendicular to the optical axis to adjust a projected image in the direction perpendicular to the optical axis.

(9)

An image projection apparatus including:

a light source; and a projection optical system that projects an image on the basis of light from the light source, the projection optical system including, in order from a side on which the light source is located to a projection side along an optical axis:

a first lens group that includes one or more lenses, has a positive focal length, and condenses light from the light source on a primary image-forming point that is an image of the light source, a deflector that scans light from the first lens group, and a second lens group that includes one or more lenses, has a positive focal length, and forms an image of light from the deflector at a position of a secondary image-forming point that is an image of the primary image-forming point, and the first lens group forming the primary image-forming point between the first lens group and the second lens group along the optical axis.

(10)

An image projection system including:

a light source;

a projection optical system that projects an image on the basis of light from the light source; and an eyepiece optical system for viewing of a projected image by the projection optical system, the projection optical system including, in order from a side on which the light source is located to a projection side along an optical axis:

a first lens group that includes one or more lenses, has a positive focal length, and condenses light from the light source on a primary image-forming point that is an image of the light source, a deflector that scans light from the first lens group, and a second lens group that includes one or more lenses, has a positive focal length, and forms an image of light from the deflector at a position of a secondary image-forming point that is an image of the primary image-forming point, and the first lens group forming the primary image-forming point between the first lens group and the second lens group along the optical axis.

This application claims the benefit of Japanese priority Patent Application JP2016-240514 filed with the Japan Patent Office on Dec. 12, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection optical system comprising, in order from a side on which a light source is located to a projection side along an optical axis:

a first lens group that includes one or more lenses, has a positive focal length, and condenses light from the light source on a primary image-forming point that is an image of the light source;

a deflector that scans light from the first lens group; and a second lens group that includes one or more lenses, has a positive focal length, and forms an image of light from the deflector at a position of a secondary image-forming point that is an image of the primary image-forming point, and the first lens group forming the primary image-forming point between the first lens group and the second lens group along the optical axis;

wherein a following expression is satisfied with a predetermined wavelength $\lambda$, where $f_2$ represents a focal length of the second lens group, $\omega_1$ represents a beam waist radius of the primary image-forming point, and $d_2$ represents a distance from the primary image-forming point to a front-side main point of the second lens group:

$$d_2 \geq f_2 + \pi \cdot \omega_1^2 / \lambda.$$

2. The projection optical system according to claim 1, wherein the first lens group includes a combined lens of a positive lens and a negative lens.

3. The projection optical system according to claim 1, wherein the first lens group includes only a plurality of positive single lenses, and axial chromatic aberration is corrected through adjusting an interval between the light source and the first lens group.

4. The projection optical system according to claim 1, wherein the second lens group includes a combined lens of a positive lens and a negative lens.

5. The projection optical system according to claim 1, wherein the second lens group has one or more transmission surfaces having a free-form surface shape.

6. The projection optical system according to claim 1, wherein one or more lenses of the lens in the first lens group and the lens in the second lens group are moved in a direction along the optical axis to perform focusing on a projection position.

7. The projection optical system according to claim 1, wherein one or more lenses of the lens in the first lens group and the lens in the second lens group are moved in a direction perpendicular to the optical axis to adjust a projected image in the direction perpendicular to the optical axis.

8. An image projection apparatus comprising:
a light source; and
a projection optical system that projects an image on a basis of light from the light source,
the projection optical system including, in order from a side on which the light source is located to a projection side along an optical axis:
a first lens group that includes one or more lenses, has a positive focal length, and condenses light from the light source on a primary image-forming point that is an image of the light source,
a deflector that scans light from the first lens group, and
a second lens group that includes one or more lenses, has a positive focal length, and forms an image of light from the deflector at a position of a secondary image-forming point that is an image of the primary image-forming point, and
the first lens group forming the primary image-forming point between the first lens group and the second lens group along the optical axis;
wherein a following expression is satisfied with a predetermined wavelength $\lambda$, where $f_2$ represents a focal length of the second lens group, $\omega_1$ represents a beam waist radius of the primary image-forming point, and $d_2$ represents a distance from the primary image-forming point to a front-side main point of the second lens group:

$$d_2 \geq f_2 + \pi \cdot \omega_1^2 / \lambda.$$

9. An image projection system comprising:
a light source;
a projection optical system that projects an image on a basis of light from the light source; and
an eyepiece optical system for viewing of a projected image by the projection optical system,
the projection optical system including, in order from a side on which the light source is located to a projection side along an optical axis:
a first lens group that includes one or more lenses, has a positive focal length, and condenses light from the light source on a primary image-forming point that is an image of the light source,
a deflector that scans light from the first lens group, and
a second lens group that includes one or more lenses, has a positive focal length, and forms an image of light from the deflector at a position of a secondary image-forming point that is an image of the primary image-forming point, and
the first lens group forming the primary image-forming point between the first lens group and the second lens group along the optical axis;
wherein a following expression is satisfied with a predetermined wavelength $\lambda$, where $f_2$ represents a focal length of the second lens group, $\omega_1$ represents a beam waist radius of the primary image-forming point, and $d_2$ represents a distance from the primary image-forming point to a front-side main point of the second lens group:

$$d_2 \geq f_2 + \pi \cdot \omega_1^2 / \lambda.$$

* * * * *